United States Patent
Chen et al.

(10) Patent No.: US 11,231,613 B1
(45) Date of Patent: Jan. 25, 2022

(54) DISPLAY APPARATUS

(71) Applicant: Au Optronics Corporation, Hsinchu (TW)

(72) Inventors: Guan-Yu Chen, Hsinchu (TW); Wei-Ming Cheng, Hsinchu (TW); Min-Hsuan Chiu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/196,897

(22) Filed: Mar. 9, 2021

(30) Foreign Application Priority Data

Jul. 27, 2020 (TW) .................................. 109125306

(51) Int. Cl.
G02F 1/1335 (2006.01)
G02F 1/1337 (2006.01)
G02F 1/1347 (2006.01)
G02F 1/13 (2006.01)

(52) U.S. Cl.
CPC ...... *G02F 1/133531* (2021.01); *G02F 1/1323* (2013.01); *G02F 1/1347* (2013.01); *G02F 1/133784* (2013.01)

(58) Field of Classification Search
CPC .............................. G02F 1/1347–13478; G02F 1/133528–133531; G02F 1/1323
See application file for complete search history.

(56) References Cited

U.S. PATENT DOCUMENTS

| | | | |
|---|---|---|---|
| 8,144,273 B2 | 3/2012 | Chen et al. | |
| 10,109,241 B2 | 10/2018 | Yoo et al. | |
| 10,490,138 B2 | 11/2019 | Nam et al. | |
| 2005/0190329 A1* | 9/2005 | Okumura | G02F 1/1393 349/123 |
| 2008/0266226 A1 | 10/2008 | Park et al. | |
| 2010/0128200 A1* | 5/2010 | Morishita | G02F 1/1323 349/62 |
| 2012/0062527 A1* | 3/2012 | Cheong | G02F 1/1347 345/204 |

FOREIGN PATENT DOCUMENTS

| | | | |
|---|---|---|---|
| CN | 101295093 | 10/2008 | |
| TW | I712025 | 12/2020 | |
| WO | WO-2018178795 A1 * | 10/2018 | G02F 1/1347 |

* cited by examiner

*Primary Examiner* — Mariceli Santiago
(74) *Attorney, Agent, or Firm* — JCIPRNET

(57) ABSTRACT

A display apparatus includes a backlight, a first polarizer, a light controlling panel, a second polarizer, a display panel, and a third polarizer sequentially arranged along a direction. A transmission axis of the first polarizer and a transmission axis of the second polarizer are substantially parallel, and the transmission axis of the second polarizer and a transmission axis of the third polarizer are substantially perpendicular. A set of the first polarizer, the light controlling panel, and the second polarizer has a transmittance, and the transmittance has a maximum value when the light controlling panel is not enabled.

7 Claims, 24 Drawing Sheets

DISPLAY APPARATUS

CROSS-REFERENCE TO RELATED APPLICATION

This application claims the priority benefit of Taiwan application serial no. 109125306, filed on Jul. 27, 2020. The entirety of the above-mentioned patent application is hereby incorporated by reference herein and made a part of this specification.

BACKGROUND OF THE INVENTION

Field of the Invention

The invention relates to an optoelectronic apparatus, and more particularly, to a display apparatus.

Description of Related Art

A display apparatus with a dual cell architecture may be composed of a backlight, a shutter, and a display. Stacking the shutter and two panels of the display and simultaneously performing light adjustment and display actions independently may improve the contrast of the display apparatus. The light beam emitted from the backlight sequentially passes through the lower polarizer of the shutter, the liquid crystal layer, and the upper polarizer of the shutter. By changing the state of the liquid crystal layer of the shutter, the shutter may provide light beams of different intensities to the display panel of the display, thereby achieving a high contrast effect. Under a dual-panel architecture, the light beam from the backlight needs to pass through the shutter and the two panels of the display before reaching the eyes of an observer. Therefore, the backlight source of a display apparatus with a dual-panel architecture needs to provide greater brightness, thus causing the phenomenon of excessive temperature. In order to solve the issue of excessive temperature, the overall transmittance of the display apparatus of the dual-panel architecture needs to be increased.

SUMMARY OF THE INVENTION

The invention provides a display apparatus having good performance.

A display apparatus of the invention includes a backlight, a first polarizer, a light controlling panel, a second polarizer, a display panel, and a third polarizer sequentially arranged along a direction. A transmission axis of the first polarizer and a transmission axis of the second polarizer are substantially parallel, and the transmission axis of the second polarizer and a transmission axis of the third polarizer are substantially perpendicular. A set of the first polarizer, the light controlling panel, and the second polarizer has a transmittance, and the transmittance has a maximum value when the light controlling panel is not enabled.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
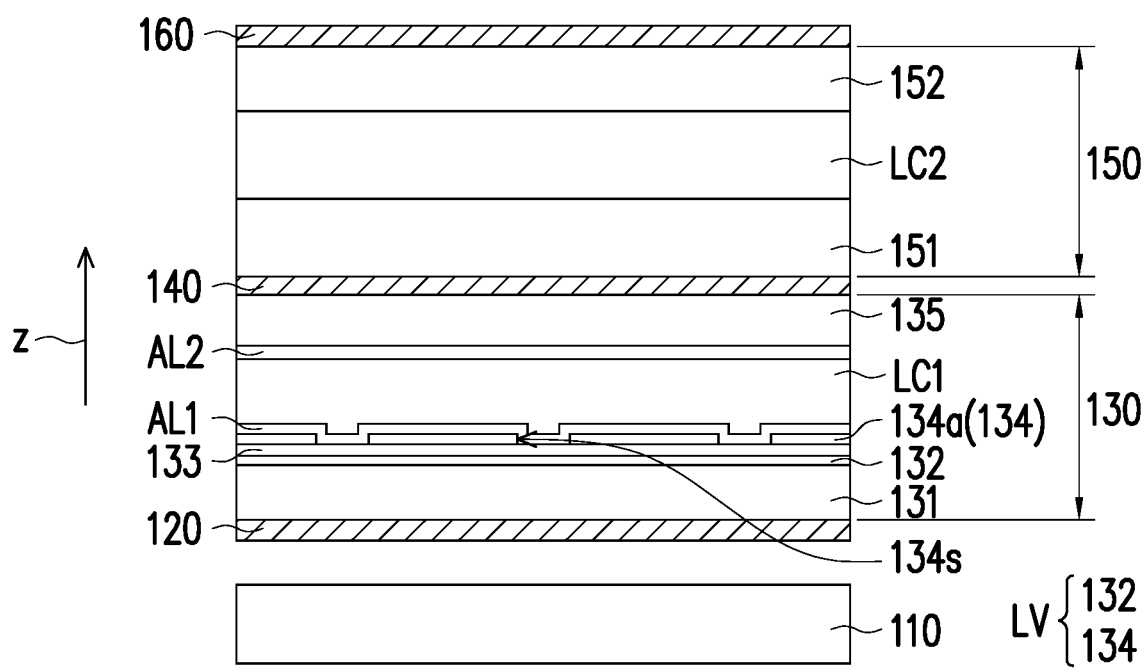
FIG. 1 is a schematic cross-sectional view of a display apparatus 10 of an embodiment of the invention.

Hereinafter, exemplary embodiments of the invention are described in detail, and examples of the exemplary embodiments are conveyed via the figures. Wherever possible, the same reference numerals are used in the figures and the descriptions to refer to the same or similar portions.

It should be understood that, when a layer, film, region, or a device of a substrate is "on" another device or "connected to" another device, the device may be directly on the other device or connected to the other device, or an intermediate device may also be present. On the other hand, when a device is "directly on another device" or "directly connected to" another device, an intermediate device is not present. As used in the present specification, "connected to" may refer to a physical and/or electrical connection. Furthermore, "electrically connected" or "coupled" may mean that other devices are present between two devices.

"About", "similar", or "substantially" used in the present specification include the value and the average value within an acceptable deviation range of a specific value confirmed by those having ordinary skill in the art, and the concerned measurement and a specific quantity (i.e., limitations of the measuring system) of measurement-related errors are taken into consideration. For example, "about" may represent within one or a plurality of standard deviations of the value, or within ±30%, ±20%, ±10%, or ±5%. Moreover, "about", "similar", or "substantially" used in the present specification may include a more acceptable deviation range or standard deviation according to optical properties, etching properties, or other properties, and one standard deviation does not need to apply to all of the properties.

Unless otherwise stated, all of the terminology used in the present specification (including technical and scientific terminology) have the same definition as those commonly understood by those skilled in the art of the invention. It should be further understood that, terminology defined in commonly-used dictionaries should be interpreted to have the same definitions in related art and in the entire specification of the invention, and are not interpreted as ideal or overly-formal definitions unless clearly stated as such in the present specification.

FIG. 1 is a schematic cross-sectional view of a display apparatus 10 of an embodiment of the invention.

Referring to FIG. 1, the display apparatus 10 includes a backlight source 110, a first polarizer 120, a light controlling panel 130, a second polarizer 140, a display panel 150, and a third polarizer 160 sequentially arranged along a direction z.

The display panel 150, the third polarizer 160 located above the display panel 150, and the second polarizer 140 located below the display panel 150 may be regarded as a display. In the present embodiment, the liquid crystal efficiency of each area of the light controlling panel 130 may be adjusted according to the desired brightness of each area of the display screen of the display, thereby improving the contrast of the display apparatus 10.

For example, the display screen of the display includes dark areas and bright areas; the liquid crystal efficiency of the area of the light controlling panel 130 located below the dark areas of the display screen may be adjusted to a relatively low value, so that the light beam emitted by the backlight source 110 does not readily pass through the dark areas of the display screen; the liquid crystal efficiency of the area of the light controlling panel 130 located below the bright areas of the display screen may be adjusted to a relatively high value, so that most of the light beam emitted by the backlight source 110 may pass through the bright areas of the display screen; therefore, the brightness of the dark areas of the display screen may be reduced, and the bright areas of the display screen still have considerable brightness, so the contrast of the display apparatus 10 may be improved.

In the present embodiment, the display panel 150 includes a first substrate 151, a second substrate 152, a liquid crystal layer LC2, and a plurality of pixel structures (not shown). The second substrate 152 is disposed opposite to the first substrate 151. The liquid crystal layer LC2 is disposed between the first substrate 151 and the second substrate 152. In the present embodiment, a plurality of pixel structures (not shown) may be optionally disposed on the first substrate 151, but the invention is not limited thereto.

Each of the pixel structures includes a pixel electrode (not shown) and a common electrode (not shown), wherein the potential difference between the pixel electrode and the common electrode is used to drive a plurality of liquid crystal molecules (not shown) of the liquid crystal layer LC2, so that the display panel 150 may provide a display screen. In the present embodiment, each of the pixel structures may also include a thin film transistor electrically connected to the pixel electrode, and the display panel 150 may also include a plurality of scan lines (not shown) and a plurality of data lines (not shown), wherein the thin film transistor of each of the pixel structures is electrically connected to a corresponding scan line and a corresponding data line.

It should be noted that the invention does not limit the type of the display panel 150, and the display panel 150 may be any type of non-self-light-emitting display panel. For example, in the present embodiment, the display panel 150 may be a liquid crystal display panel of a twisted nematic (TN) mode, a vertical alignment (VA) mode, a fringe field switching (FFS) mode, an in-plane switching (IPS) mode, an electrically controlled birefringence (ECB) mode, or other modes.

The light controlling panel 130 is disposed between the display panel 150 and the backlight 110. The light controlling panel 130 includes a first substrate 131, a first alignment film AL1, a liquid crystal layer LC1, a second alignment film AL2, and a second substrate 135 sequentially arranged along the direction z. For example, in the present embodiment, the material of the first alignment film AL1 and the material of the second alignment film AL2 may include polyimide, organic materials with photoreactive groups, or other materials suitable for liquid crystal alignment, but the invention is not limited thereto.

The light controlling panel 130 further includes a plurality of light valve structures LV disposed corresponding to a plurality of pixel structures (not shown) of the display panel 150. Each of the light valve structures LV includes a first electrode 132 and a second electrode 134, wherein the potential difference between the first electrode 132 and the second electrode 134 is used to drive a plurality of liquid crystal molecules LCM1 of the liquid crystal layer LC1 (shown in FIG. 2A and FIG. 2B), so that the light valve structures LV may control the intensity of the light beam passing through the display.

For example, in the present embodiment, the plurality of light valve structures LV may be optionally disposed on the first substrate 131, and the first alignment film AL1 covers the plurality of light valve structures LV, but the invention is not limited thereto. Moreover, in the present embodiment, the light controlling panel 130 may also optionally include an insulating layer 133, wherein the insulating layer 133 is disposed between the first electrode 132 and the second electrode 134, one of the first electrode 132 and the second electrode 134 (for example: the second electrode 134) has a plurality of branches 134a, the plurality of branches 134a define a plurality of slits 134s, and the other of the first electrode 132 and the second electrode 134 (for example, the first electrode 132) is overlapped with the plurality of slits 134s. In other words, in the present embodiment, the light controlling panel 130 may be optionally in a fringe field switching (FFS) mode. However, the invention is not limited thereto. In other embodiments, the light controlling panel 130 may also be in other modes.

Figure 2A:
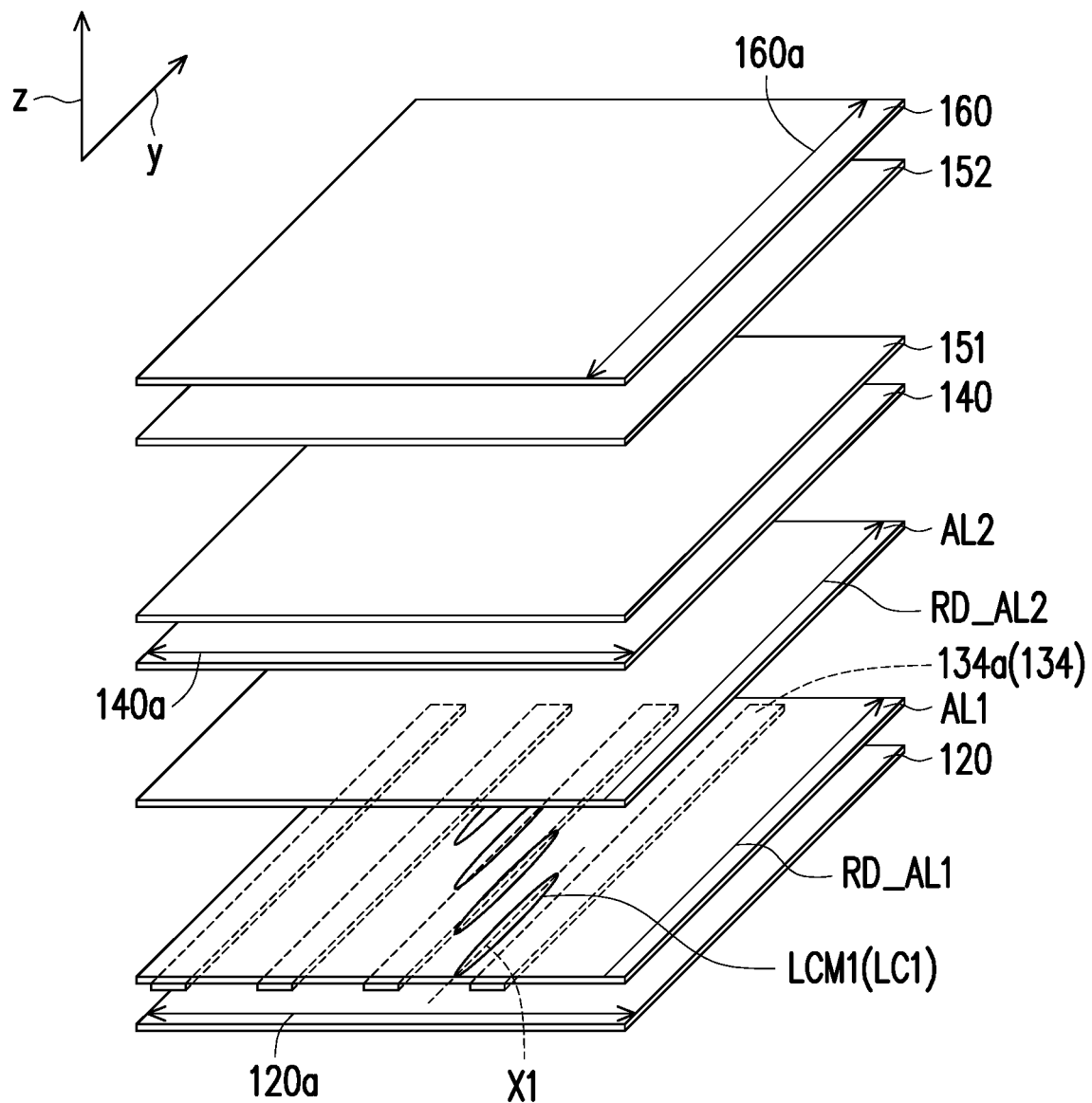
FIG. 2A shows a first polarizer 120, a second electrode 134 of a light controlling panel 130, a first alignment film AL1 of the light controlling panel 130, a liquid crystal layer LC1 of the light controlling panel 130, a second alignment film AL2 of the light controlling panel 130, a second polarizer 140, a first substrate 151 of a display panel 150, a second substrate 152 of the display panel 150, and a third polarizer 160 of FIG. 1.

FIG. 2A shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of a display panel 150, the second substrate 152 of the display panel 150, and the third polarizer 160 of FIG. 1. In particular, FIG. 2A shows the state of the liquid crystal layer LC1 when the display panel 150 of FIG. 1 has a highest gray level (for example, L255) and the light controlling panel 130 of FIG. 1 is not enabled.

Figure 2B:
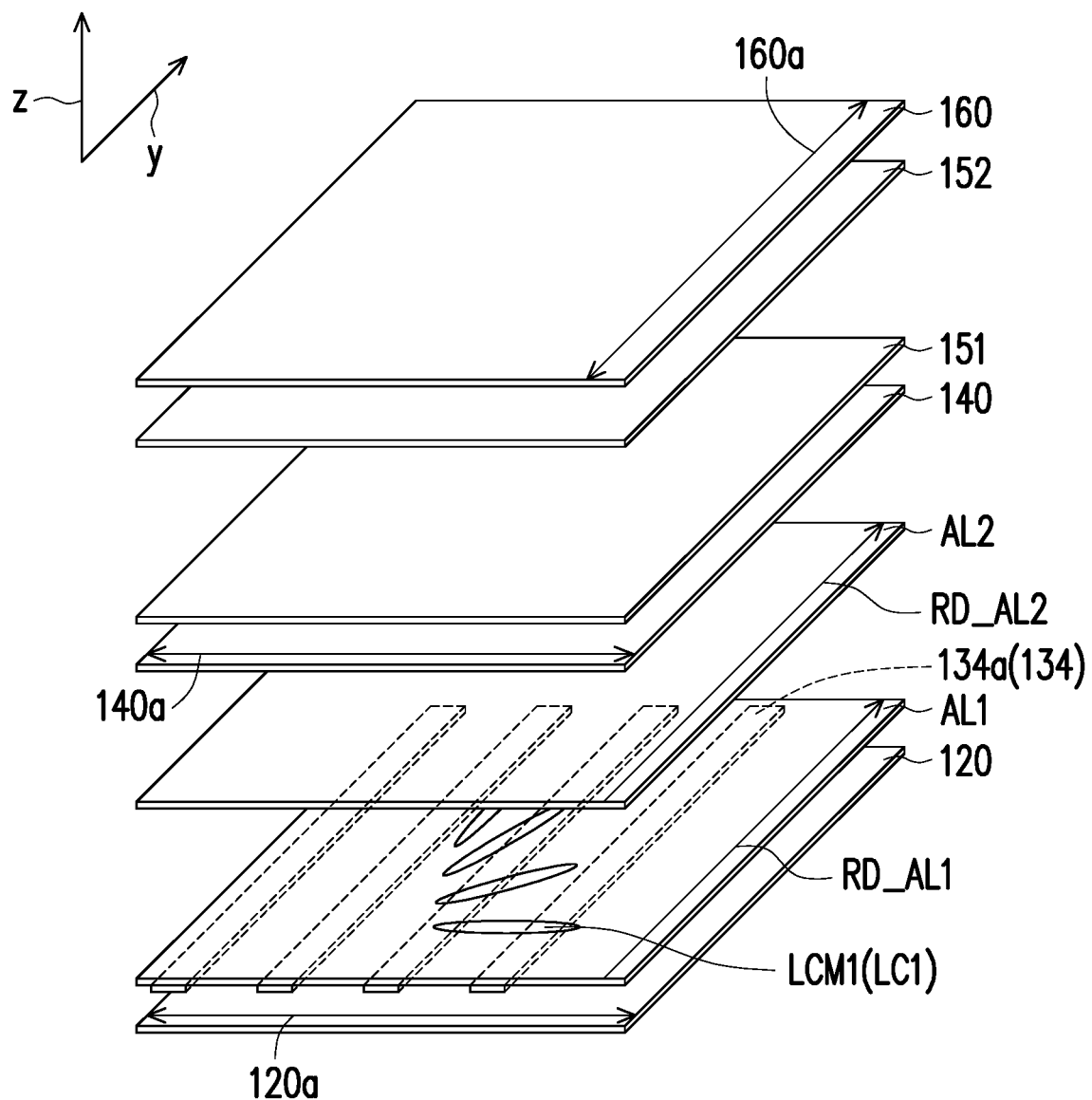
FIG. 2B shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 1.

FIG. 2B shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 1. In particular, FIG. 2B shows the state of the liquid crystal layer LC1 when the display panel 150 of FIG. 1 has a lowest gray level (for example, L0) and the light controlling panel 130 of FIG. 1 is enabled.

Referring to FIG. 1, FIG. 2A, and FIG. 2B, the first polarizer 120 is disposed between the light controlling panel 130 and the backlight source 110, the second polarizer 140 is disposed between the display panel 150 and the light controlling panel 130, and the display panel 150 is disposed between the third polarizer 160 and the second polarizer 140.

It should be noted that, a transmission axis 120a of the first polarizer 120 and a transmission axis 140a of the second polarizer 140 are substantially parallel, and the transmission axis 140a of the second polarizer 140 and a transmission axis 160a of the third polarizer 160 are substantially perpendicular. The assembly of the first polarizer 120, the light controlling panel 130, and the second polarizer 140 may be regarded as a shutter. When the light controlling panel 130 is substantially not enabled (that is, when the potential difference between the first electrode 132 and the second electrode 134 of the light valve structures LV is not enough to rotate the plurality of liquid crystal molecules LCM1 of the liquid crystal layer LC1), the transmittance of the shutter has a maximum value. In other words, the shutter including the first polarizer 120, the light controlling panel 130, and the second polarizer 140 is in a normal white mode. The liquid crystal efficiency of the shutter in the normal white mode is high, so the overall transmittance of the display apparatus 10 may be significantly improved.

Referring to FIG. 2A and FIG. 2B, in the present embodiment, the transmittance axis 120a of the first polarizer 120 and the transmittance axis 140a of the second polarizer 140 are substantially both perpendicular to a rubbing direction RD_AL1 of the first alignment film AU; and the transmittance axis 120a of the first polarizer 120 and the transmittance axis 140a of the second polarizer 140 are substantially both perpendicular to a rubbing direction RD_AL2 of the second alignment film AL2.

Referring to FIG. 1 and FIG. 2A, in the present embodiment, the rubbing direction RD_AL1 of the first alignment film AL1 and the rubbing direction RD_AL2 of the second alignment film AL2 may be substantially parallel, and when the light controlling panel 130 is substantially not enabled, a long axis X1 of the liquid crystal molecules LCM1 of the liquid crystal layer LC1 may be substantially parallel to the first substrate 131 (that is, the pretilt angle of the liquid crystal molecules LCM1 is substantially 0°, and the liquid crystal layer LC1 is horizontally aligned), but the invention is not limited thereto. Moreover, in the present embodiment, the rubbing direction RD_AL1 of the first alignment film AL1 and the rubbing direction RD_AL2 of the second alignment film AL2 may be optionally substantially parallel to an extension direction y of the branches 134a of the second electrode 134, but the invention is not limited thereto.

It should be mentioned here that, the following embodiments adopt the reference numerals of the embodiments above and a portion of the content thereof, wherein the same reference numerals are used to represent the same or similar devices and descriptions of the same technical content are omitted. The omitted portions are as described in the embodiments above and are not repeated in the embodiments below.

Figure 3:
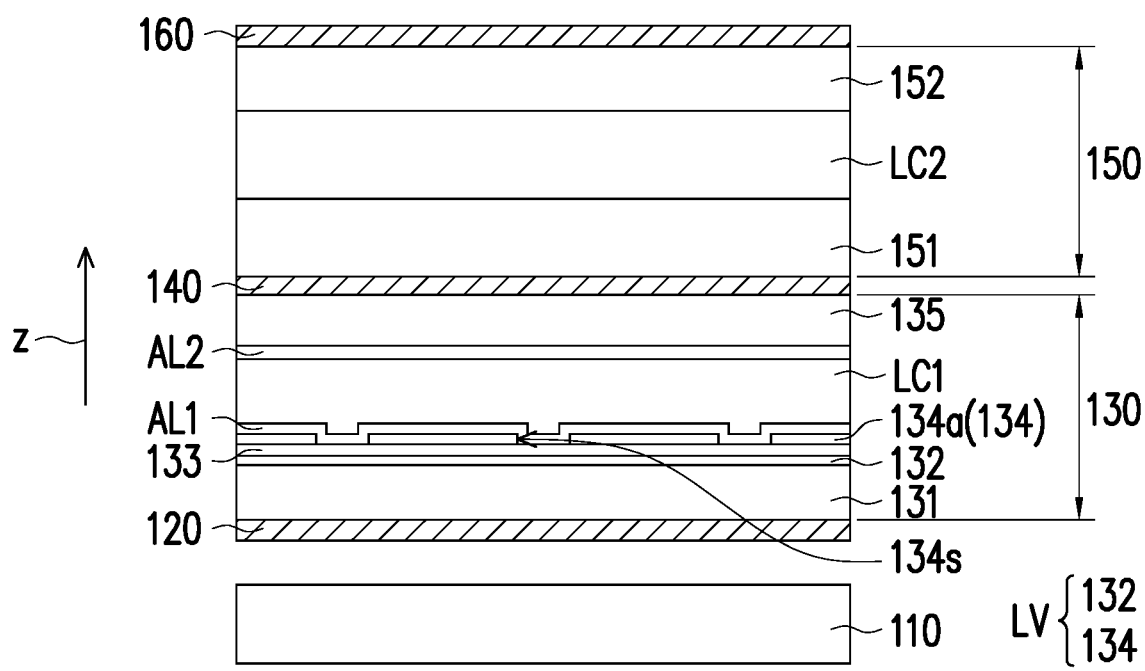
FIG. 3 is a schematic cross-sectional view of a display apparatus 10A of an embodiment of the invention.

FIG. 3 is a schematic cross-sectional view of a display apparatus 10A of an embodiment of the invention.

Figure 4A:
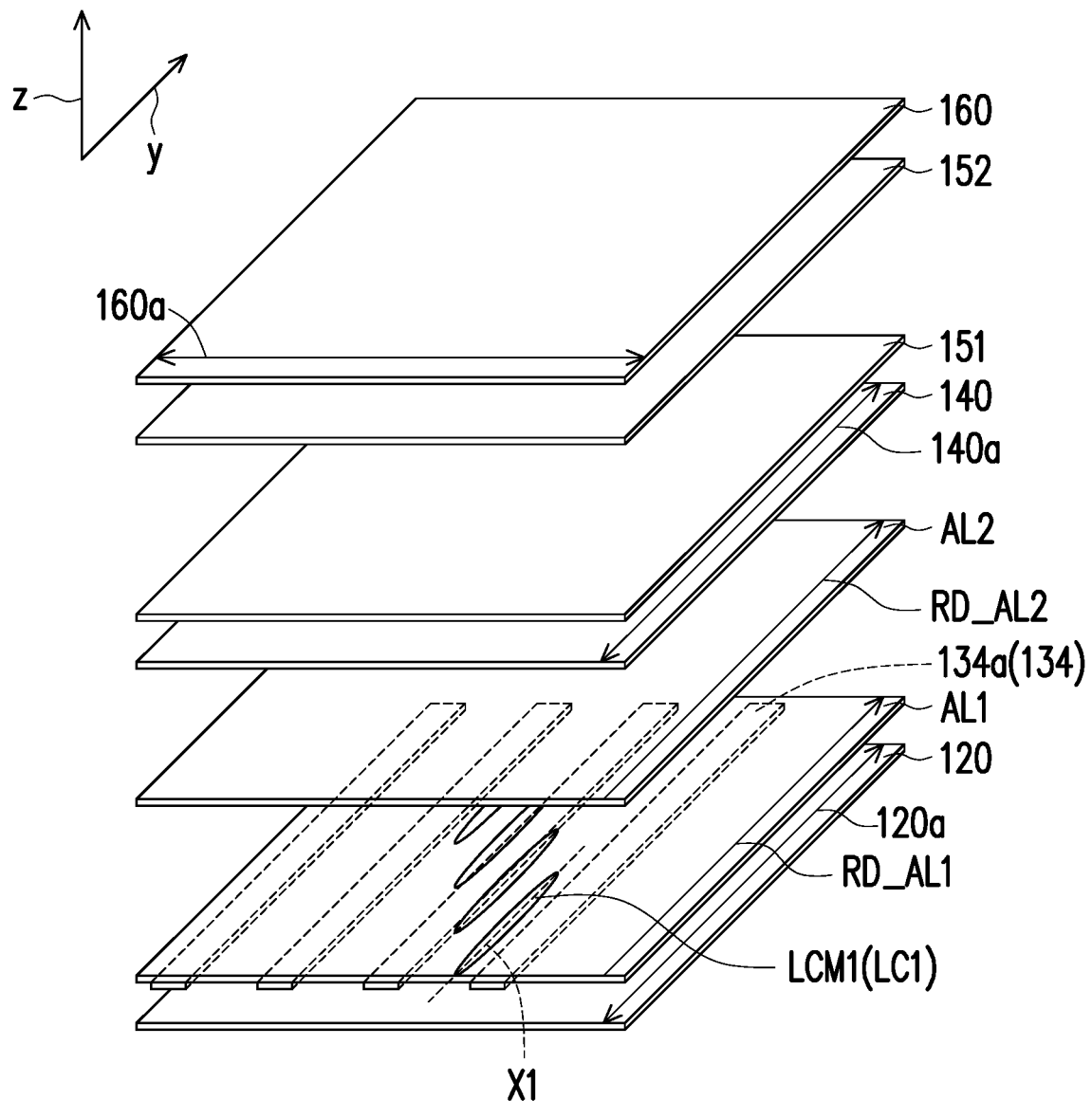
FIG. 4A shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 3.

FIG. 4A shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 3. In particular, FIG. 4A shows the state of the liquid crystal layer LC1 when the display panel 150 of FIG. 3 has a highest gray level (for example, L255) and the light controlling panel 130 of FIG. 3 is not enabled.

Figure 4B:
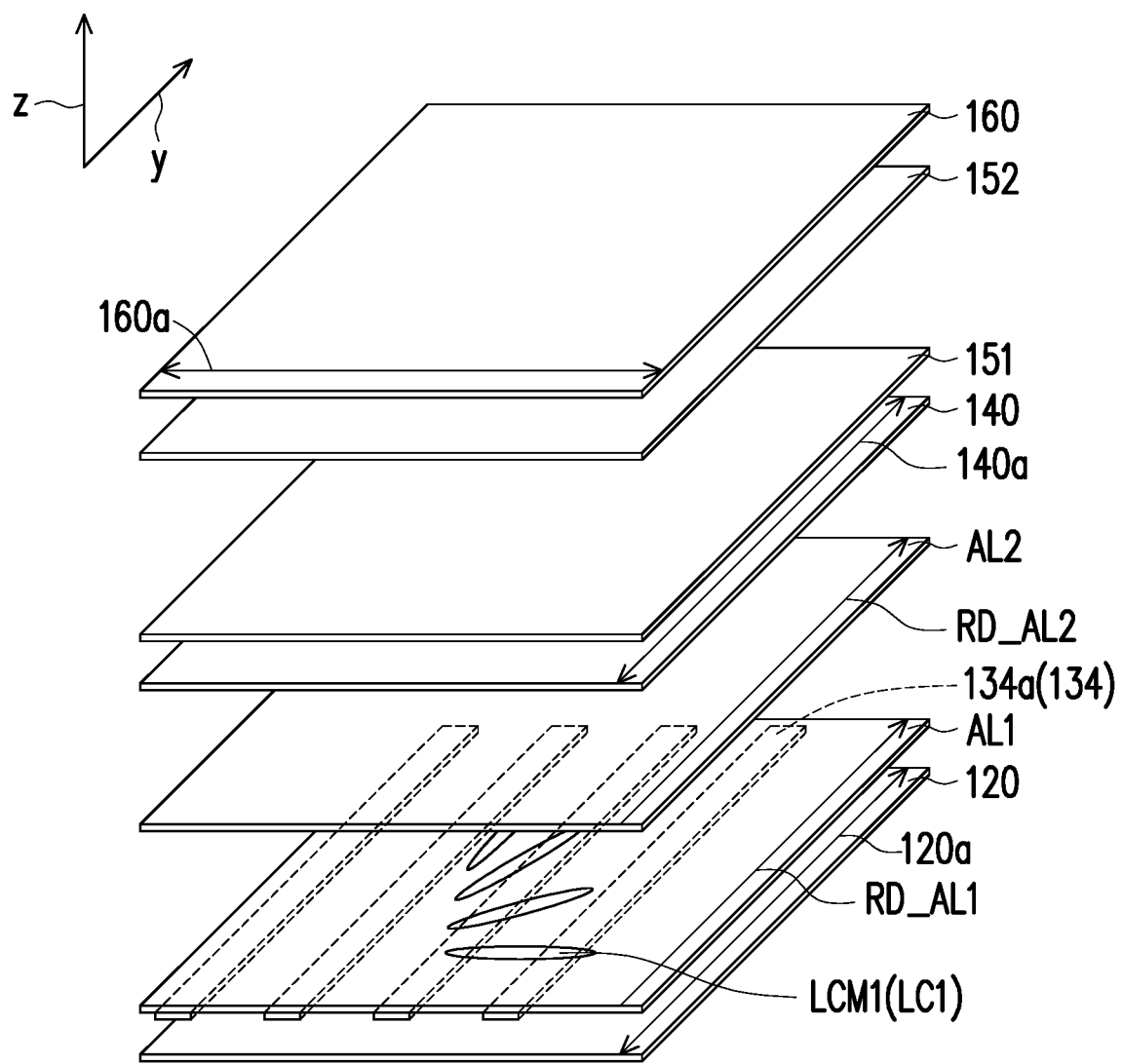
FIG. 4B shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 3.

FIG. 4B shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 3. In particular, FIG. 4B shows the state of the liquid crystal layer LC1 when the display panel 150 of FIG. 3 has a lowest gray level (for example, L0) and the light controlling panel 130 of FIG. 3 is enabled.

Referring to FIG. 3, FIG. 4A, and FIG. 4B, the display apparatus 10A of the present embodiment is similar to the display apparatus 10, and the difference between the two is: in the embodiment of FIG. 1, FIG. 2A, and FIG. 2B, the transmittance axis 120a of the first polarizer 120 and the transmittance axis 140a of the second polarizer 140 are substantially perpendicular to the rubbing direction RD_AL1 of the first alignment film AL1 and the rubbing direction RD_AL2 of the second alignment film AL2; and in the embodiment of FIG. 3, FIG. 4A, and FIG. 4B, the transmittance axis 120a of the first polarizer 120 and the transmittance axis 140a of the second polarizer 140 are substantially parallel to the rubbing direction RD_AL1 of the first alignment film AL1 and the rubbing direction RD_AL2 of the second alignment film AL2.

The display apparatus 10A has functions and advantages similar to those of the display apparatus 10 and are not repeated herein.

Figure 5:
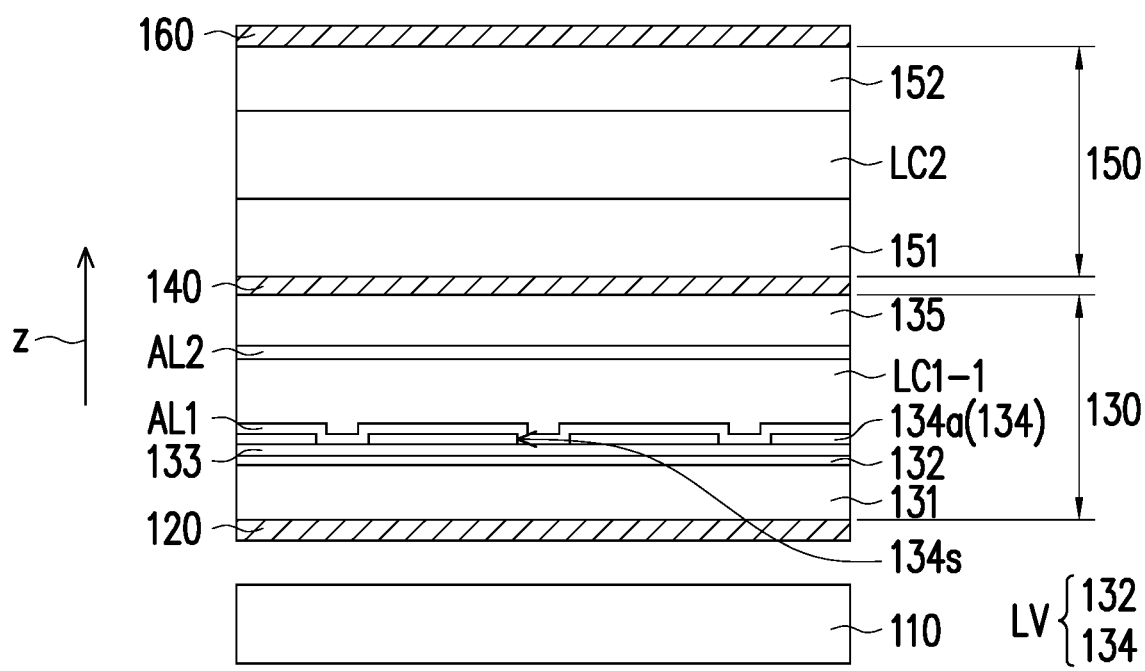
FIG. 5 is a schematic cross-sectional view of a display apparatus 10B of an embodiment of the invention.

FIG. 5 is a schematic cross-sectional view of a display apparatus 10B of an embodiment of the invention.

Figure 6A:
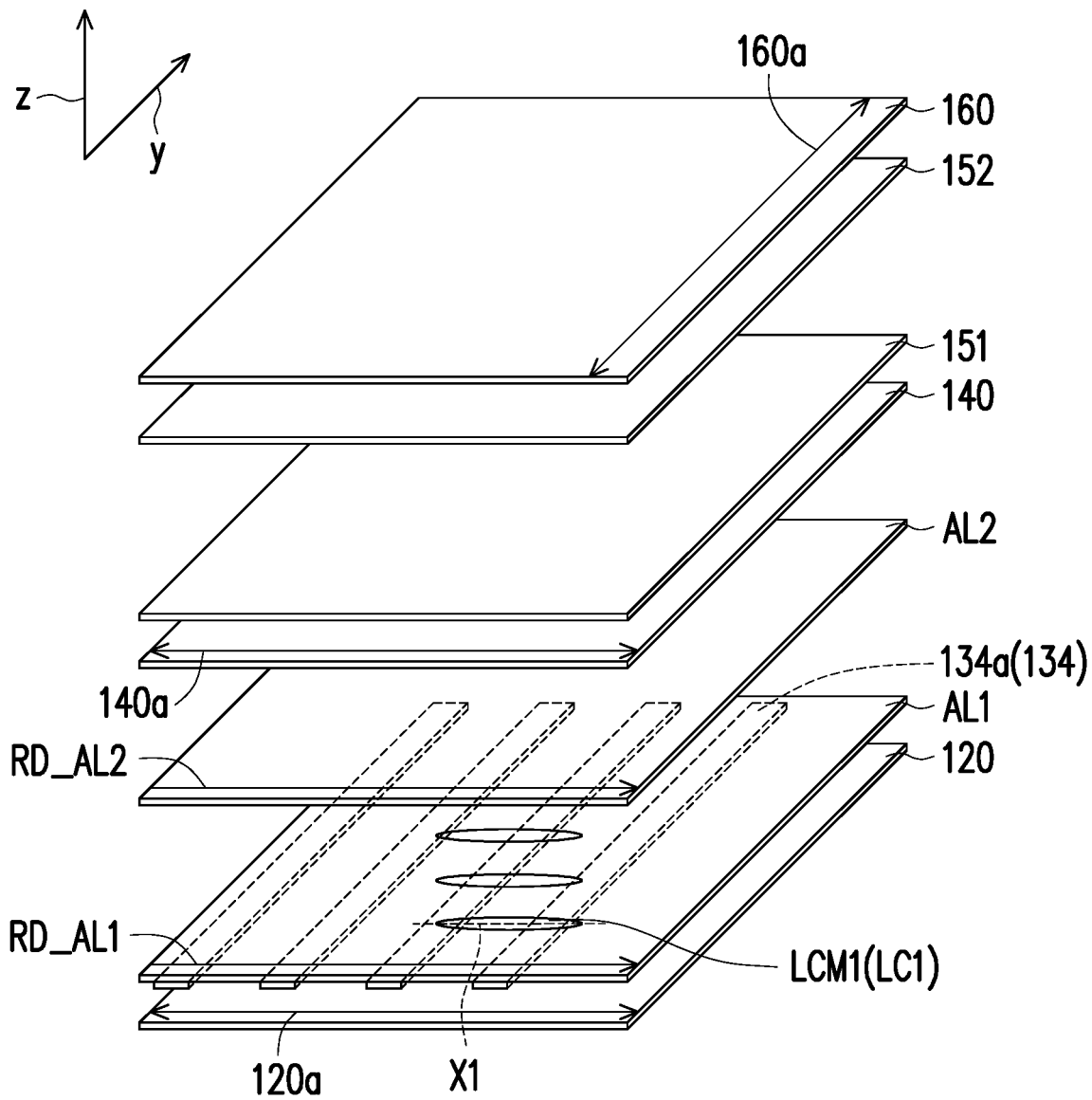
FIG. 6A shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 5.

FIG. 6A shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 5. In particular, FIG. 6A shows the state of the liquid crystal layer LC1 when the display panel 150 of FIG. 5 has a highest gray level (for example, L255) and the light controlling panel 130 of FIG. 5 is not enabled.

Figure 6B:
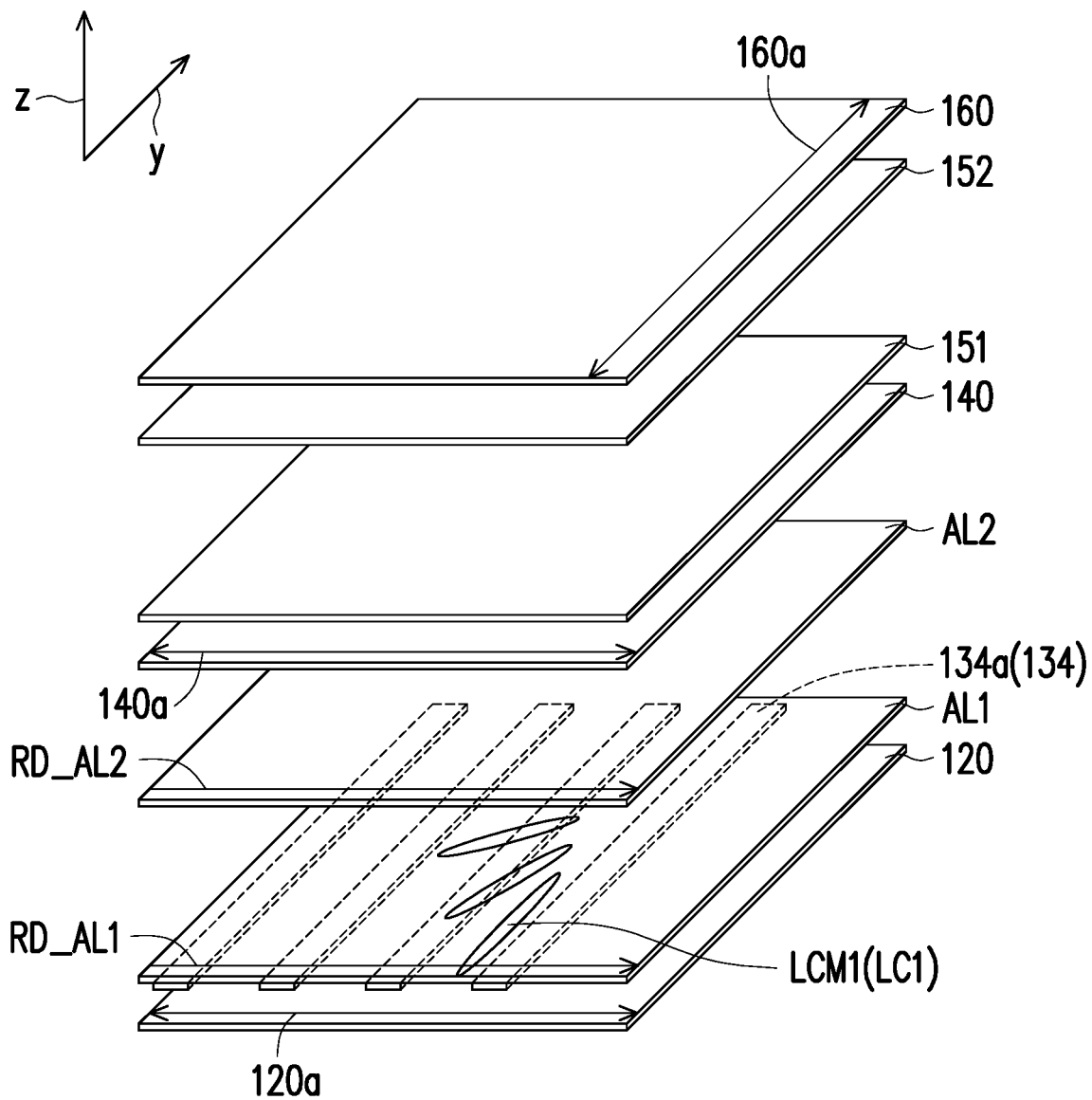
FIG. 6B shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 5.

FIG. 6B shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 5. In particular, FIG. 6B shows the state of the liquid crystal layer LC1 when the display panel 150 of FIG. 5 has a lowest gray level (for example, L0) and the light controlling panel 130 of FIG. 5 is enabled.

Referring to FIG. 5, FIG. 6A, and FIG. 6B, the display apparatus 10B of the present embodiment is similar to the display apparatus 10A, and the difference between the two is: in the embodiment of FIG. 3, FIG. 4A, and FIG. 4B, the rubbing direction RD_AL1 of the first alignment film AL1 and the rubbing direction RD_AL2 of the second alignment film AL2 may be optionally substantially parallel to the extension direction y of the branches 134a of the second electrode 134; and in the embodiment of FIG. 5, FIG. 6A, and FIG. 6B, the rubbing direction RD_AL1 of the first alignment film AL1 and the rubbing direction RD_AL2 of the second alignment film AL2 may optionally be substantially perpendicular to the extension direction y of the branches 134a of the second electrode 134.

The display apparatus 10B has functions and advantages similar to those of the display apparatus 10 and are not repeated herein.

Figure 7:
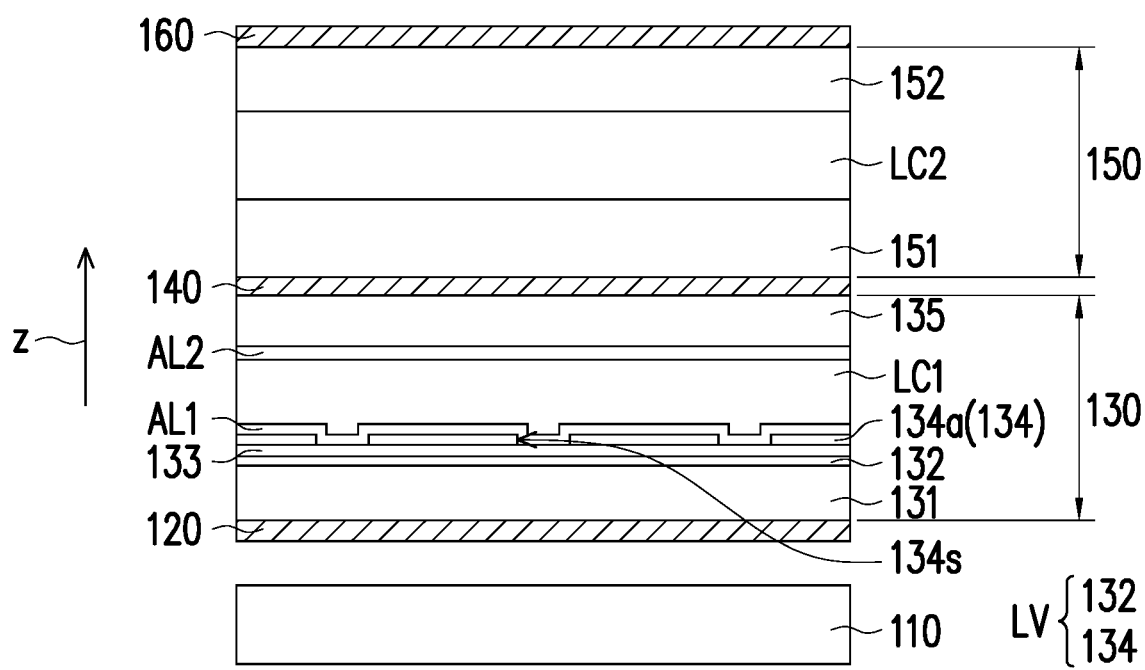
FIG. 7 is a schematic cross-sectional view of a display apparatus 10C of an embodiment of the invention.

FIG. 7 is a schematic cross-sectional view of a display apparatus 10C of an embodiment of the invention.

Figure 8A:
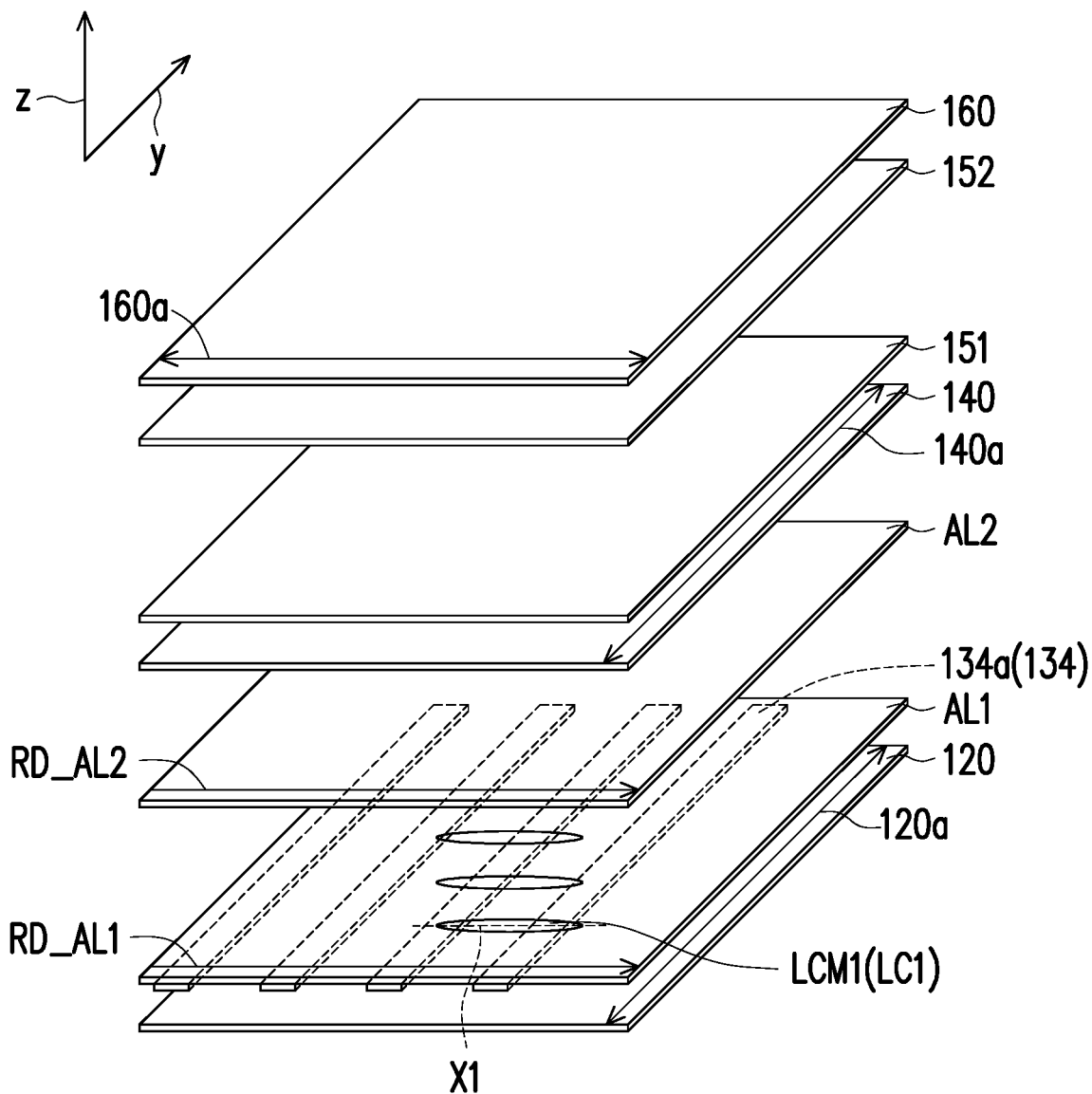
FIG. 8A shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 7.

FIG. 8A shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 7. In particular, FIG. 8A shows the state of the liquid crystal layer LC1 when the display panel 150 of FIG. 7 has a highest gray level (for example, L255) and the light controlling panel 130 of FIG. 7 is not enabled.

Figure 8B:
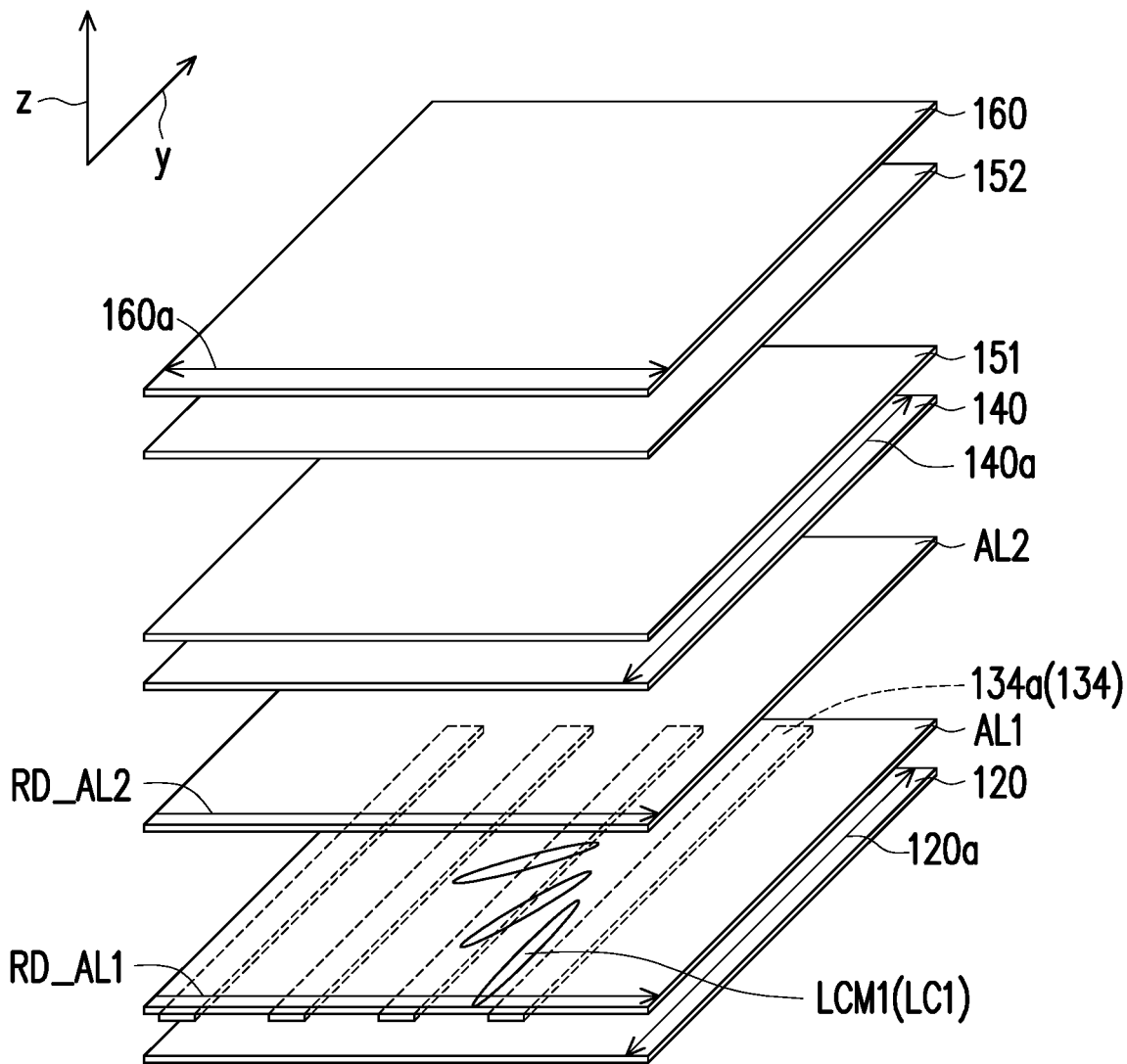
FIG. 8B shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 7.

FIG. 8B shows the first polarizer 120, the second electrode 134 of the light controlling panel 130, the first alignment film AL1 of the light controlling panel 130, the liquid crystal layer LC1 of the light controlling panel 130, the second alignment film AL2 of the light controlling panel 130, the second polarizer 140, the first substrate 151 of the display panel 150, the second substrate 152 of the display panel 150, and the third polarizer 160 of FIG. 7. In particular, FIG. 8B shows the state of the liquid crystal layer LC1 when the display panel 150 of FIG. 7 has a lowest gray level (for example, L0) and the light controlling panel 130 of FIG. 7 is enabled.

Referring to FIG. 7, FIG. 8A, and FIG. 8B, the display apparatus 10C of the present embodiment is similar to the display apparatus 10, and the difference between the two is: in the embodiment of FIG. 1, FIG. 2A, and FIG. 2B, the rubbing direction RD_AL1 of the first alignment film AL1 and the rubbing direction RD_AL2 of the second alignment film AL2 may be optionally substantially parallel to the extension direction y of the branches 134a of the second electrode 134; and in the embodiment of FIG. 7, FIG. 8A, and FIG. 8B, the rubbing direction RD_AL1 of the first alignment film AL1 and the rubbing direction RD_AL2 of the second alignment film AL2 may optionally be substantially perpendicular to the extension direction y of the branches 134a of the second electrode 134.

Figure 9:
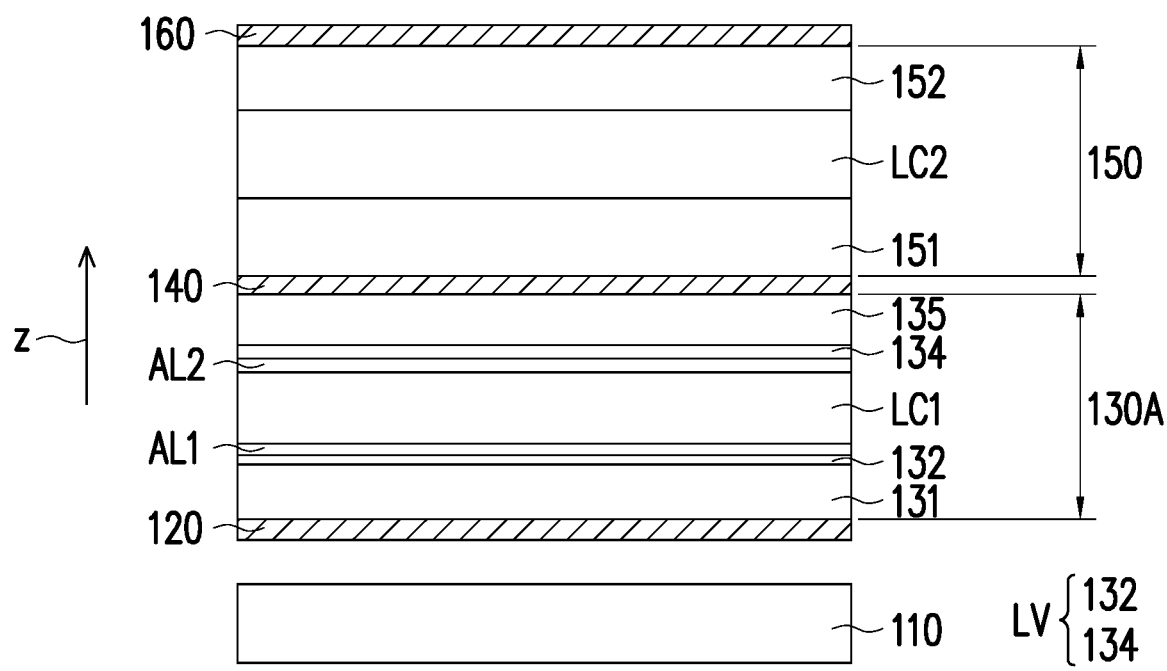
FIG. 9 is a schematic cross-sectional view of a display apparatus 10D of an embodiment of the invention.

FIG. 9 is a schematic cross-sectional view of a display apparatus 10D of an embodiment of the invention.

Figure 10A:
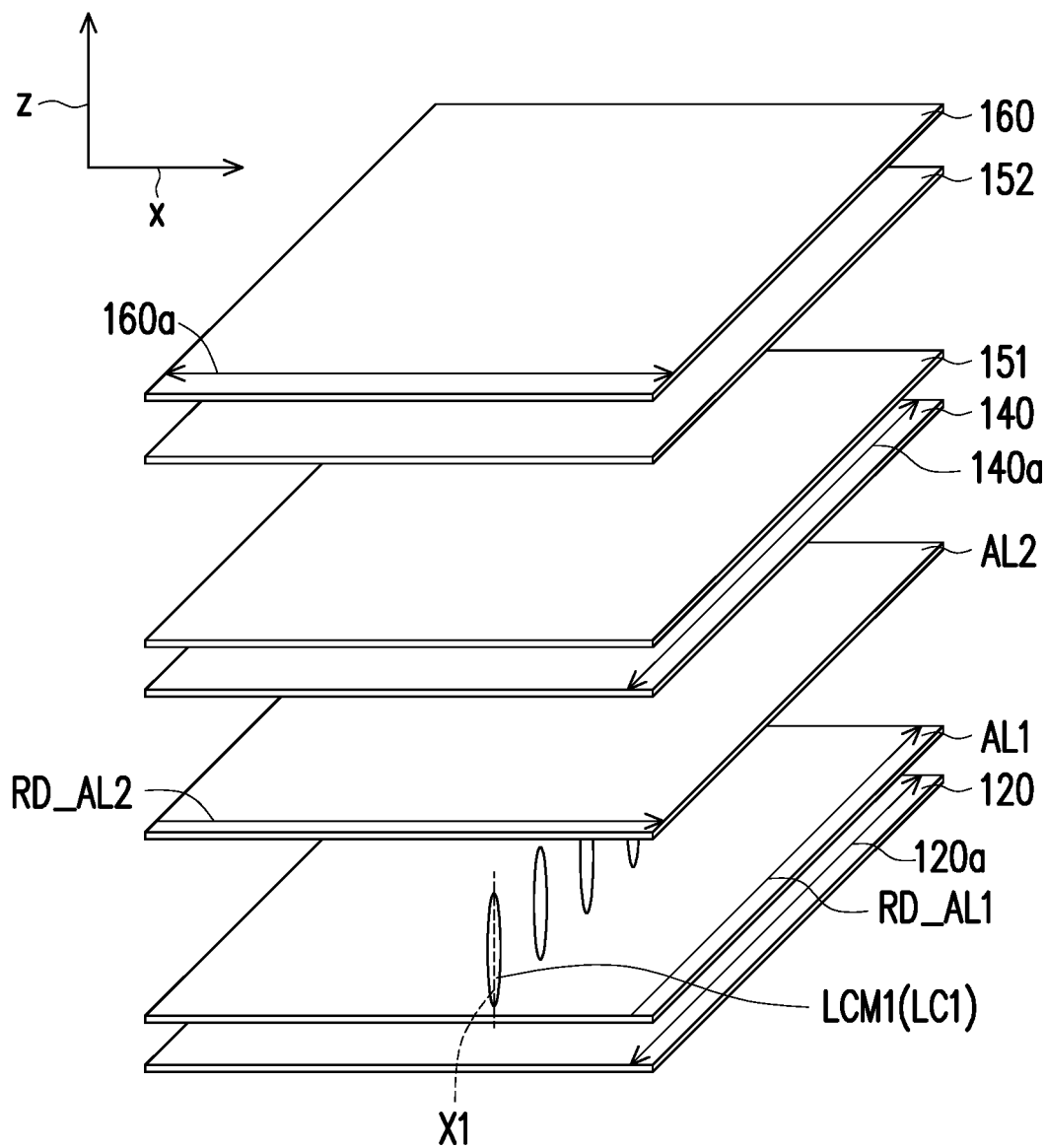
FIG. 10A shows the first polarizer 120, the first alignment film AL1 of the light controlling panel 130A, the liquid crystal layer LC1 of the light controlling panel 130A, the second alignment film AL2 of the light controlling panel 130A, the second polarizer 140, the first substrate 151 of the display panel 150, the second substrate 152 of the display panel 150, and the third polarizer 160 of FIG. 9.

FIG. 10A shows the first polarizer 120, the first alignment film AL1 of the light controlling panel 130A, the liquid crystal layer LC1 of the light controlling panel 130A, the second alignment film AL2 of the light controlling panel 130A, the second polarizer 140, the first substrate 151 of the display panel 150, the second substrate 152 of the display panel 150, and the third polarizer 160 of FIG. 9. In particular, FIG. 10A shows the state of the liquid crystal layer LC1 when the display panel 150 of FIG. 9 has a highest gray level (for example, L255) and the light controlling panel 130A of FIG. 9 is not enabled.

Figure 10B:
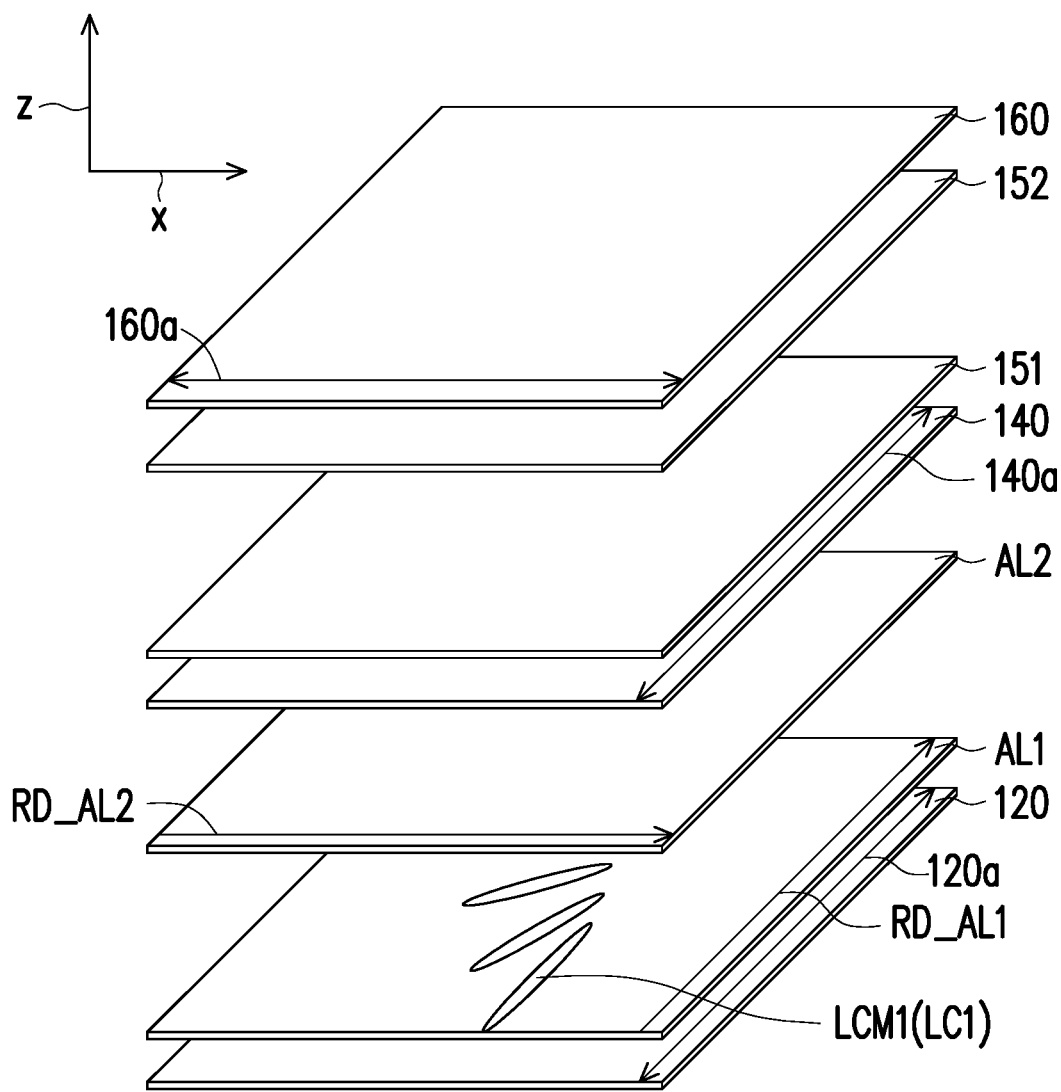
FIG. 10B shows the first polarizer 120, the first alignment film AL1 of the light controlling panel 130A, the liquid crystal layer LC1 of the light controlling panel 130A, the second alignment film AL2 of the light controlling panel 130A, the second polarizer 140, the first substrate 151 of the display panel 150, the second substrate 152 of the display panel 150, and the third polarizer 160 of FIG. 9.

FIG. 10B shows the first polarizer 120, the first alignment film AL1 of the light controlling panel 130A, the liquid crystal layer LC1 of the light controlling panel 130A, the second alignment film AL2 of the light controlling panel 130A, the second polarizer 140, the first substrate 151 of the display panel 150, the second substrate 152 of the display panel 150, and the third polarizer 160 of FIG. 9. In particular, FIG. 10B shows the state of the liquid crystal layer LC1 when the display panel 150 of FIG. 9 has a lowest gray level (for example, L0) and the light controlling panel 130A of FIG. 9 is enabled.

Referring to FIG. 9, FIG. 10A, and FIG. 10B, the display apparatus 10D of the present embodiment is similar to the display apparatus 10. The difference between the two is that the light controlling panel 130A of the display apparatus 10D is different from the light controlling panel 130 of the display apparatus 10.

Referring to FIG. 9, in the present embodiment, the first electrode 132 and the second electrode 134 of the light valve structures LV of the light controlling panel 130A are respectively disposed on the first substrate 131 and the second substrate 135, the first alignment film AL1 covers the first electrode 132, and the second alignment film AL2 covers the second electrode 134, and the first electrode 132 and the second electrode 134 of the light valve structures LV of the light controlling panel 130A are both full-surface electrodes. Moreover, in the present embodiment, the rubbing direction RD_AL1 of the first alignment film AL1 and the rubbing direction RD_AL2 of the second alignment film AL2 may be substantially perpendicular, and when the light controlling panel 130A is substantially not enabled, the long axis X1 of the liquid crystal molecules LCM1 of the liquid crystal layer LC1 may be substantially perpendicular to the first substrate 131 (that is, the pretilt angle of the liquid crystal molecules LCM1 is substantially 90°). In short, in the present embodiment, the light controlling panel 130A may be a special twisted nematic mode; and different from the traditional twisted nematic (TN) mode, the liquid crystal layer LC1 of the light controlling panel 130A of the special TN mode is vertically aligned.

In the present embodiment, the transmittance axis 120a of the first polarizer 120 and the transmittance axis 140a of the second polarizer 140 are substantially parallel to the rubbing direction RD_AL1 of the first alignment film AL1, and the transmittance axis 120a of the first polarizer 120 and the transmittance axis 140a of the second polarizer 140 are substantially perpendicular to the rubbing direction RD_AL2 of the second alignment film AL2, but the invention is not limited thereto.

Similarly, in the present embodiment, the transmittance axis 120a of the first polarizer 120 and the transmittance axis 140a of the second polarizer 140 are substantially parallel, and the transmittance axis 140a of the second polarizer 140 and the transmittance axis 160a of the third polarizer 160 are substantially perpendicular; and the assembly of the first polarizer 120, the light controlling panel 130A, and the second polarizer 140 may be regarded as a shutter. When the light controlling panel 130A is substantially not enabled (that is, when the potential difference between the first electrode 132 and the second electrode 134 of the light valve structures LV is not enough to rotate the plurality of liquid crystal molecules LCM1 of the liquid crystal layer LC1), the transmittance of the shutter has a maximum value. In other words, the shutter including the first polarizer 120, the light controlling panel 130A, and the second polarizer 140 is in a normal white mode. The liquid crystal efficiency of the shutter in the normal white mode is high, so the overall transmittance of the display apparatus 10D may be significantly improved.

The difference between the display apparatus (not shown) of a comparative example and the display apparatus 10D of the present embodiment is: the light controlling panel of the display apparatus of the comparative example is the traditional twisted nematic (TN) mode, and the plurality of transmittance axes of the first polarizer and the second polarizer respectively located above and below the light controlling panel of the comparative example are substantially perpendicular.

In the case in which the display panel of the display apparatus of the comparative example displays a highest grayscale screen (for example: L255 grayscale screen) and the light controlling panel of the display apparatus of the comparative example is not enabled, the brightness of the display apparatus of the comparative example may be measured to be 295 nits. In the case in which the display panel 150 of the display apparatus 10D of the present embodiment displays a highest grayscale screen (for example: L255 grayscale screen) and the light controlling panel 130A of the display apparatus 10D of the present embodiment is not enabled, the brightness of the display apparatus 10D of the present embodiment may be measured to be 608 nits. In other words, the transmittance of the display apparatus 10D of the present embodiment is about twice the transmittance of the display apparatus of the comparative example. The measured data may confirm that the overall transmittance of the display apparatus 10D of the present embodiment may indeed be significantly improved.

Figure 11:
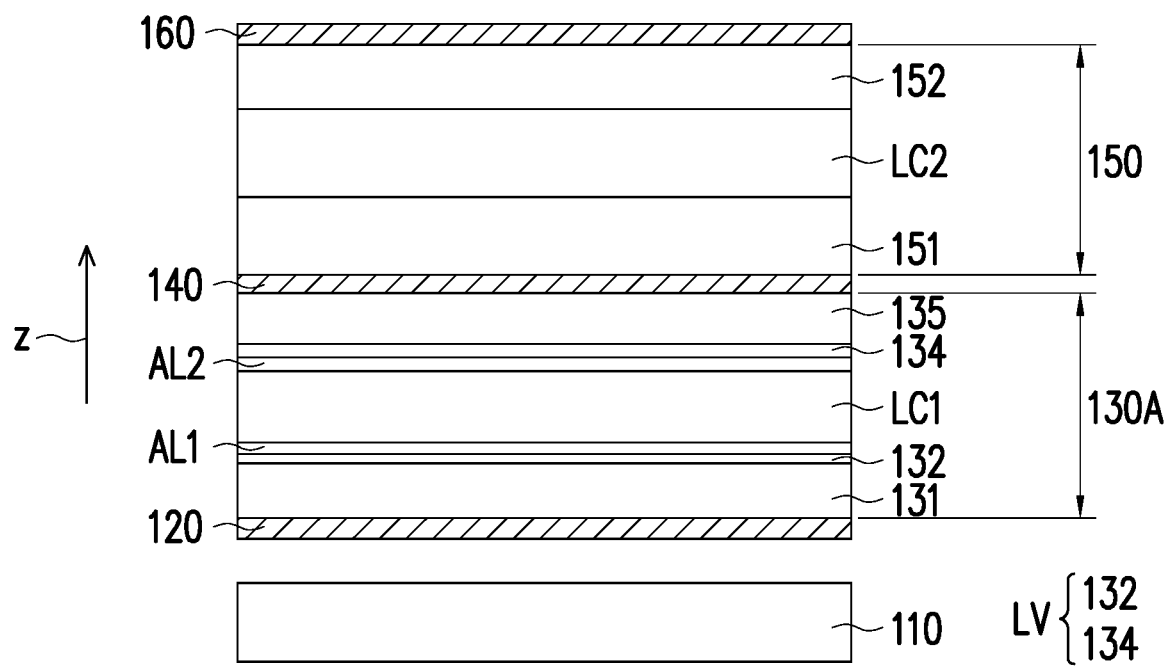
FIG. 11 is a schematic cross-sectional view of a display apparatus 10E of an embodiment of the invention.

FIG. 11 is a schematic cross-sectional view of a display apparatus 10E of an embodiment of the invention.

Figure 12A:
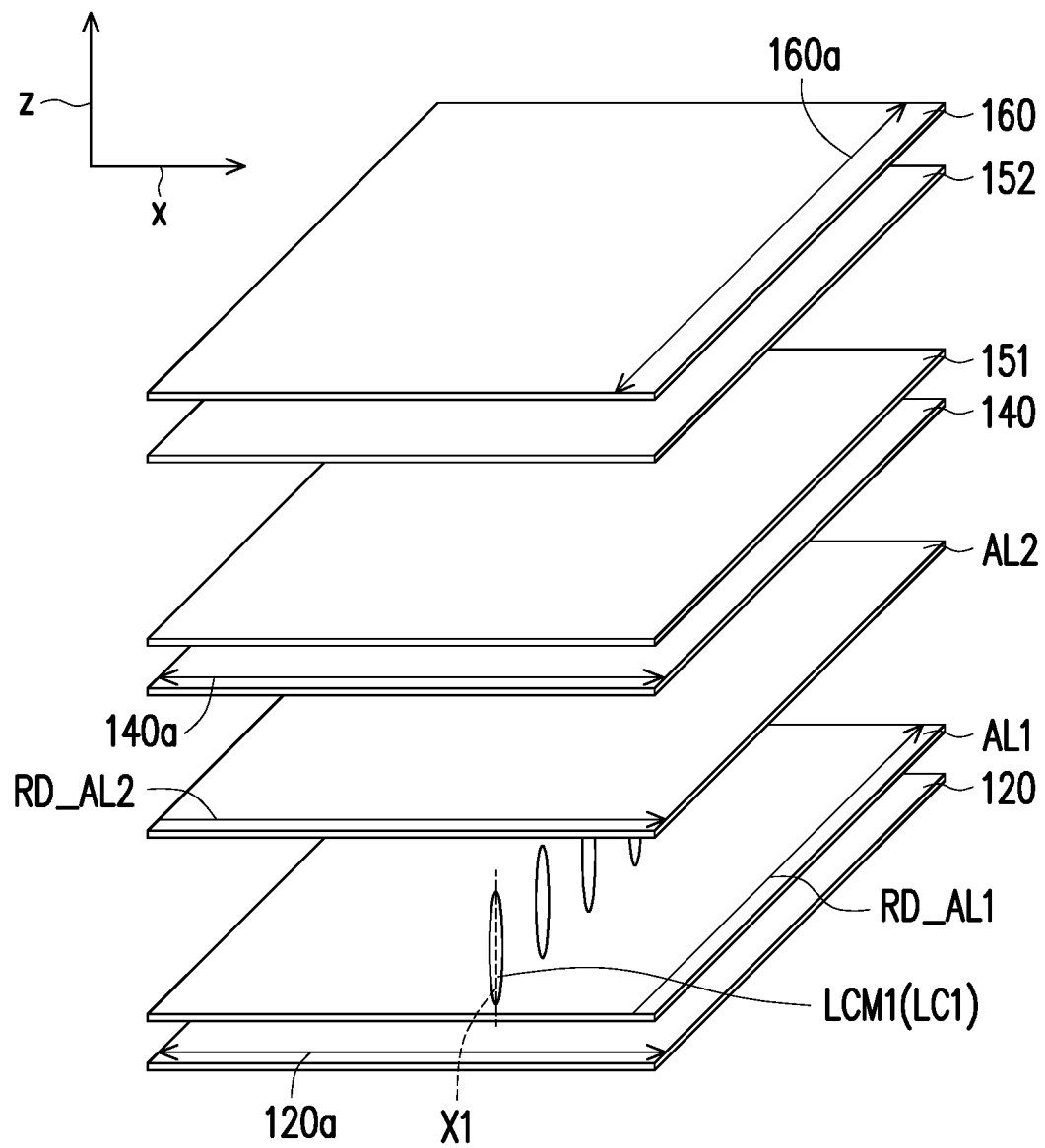
FIG. 12A shows the first polarizer 120, the first alignment film AL1 of the light controlling panel 130A, the liquid crystal layer LC1 of the light controlling panel 130A, the second alignment film AL2 of the light controlling panel 130A, the second polarizer 140, the first substrate 151 of the display panel 150, the second substrate 152 of the display panel 150, and the third polarizer 160 of FIG. 11.

FIG. 12A shows the first polarizer 120, the first alignment film AL1 of the light controlling panel 130A, the liquid crystal layer LC1 of the light controlling panel 130A, the second alignment film AL2 of the light controlling panel 130A, the second polarizer 140, the first substrate 151 of the display panel 150, the second substrate 152 of the display panel 150, and the third polarizer 160 of FIG. 11. In particular, FIG. 12A shows the state of the liquid crystal layer LC1 when the display panel 150 of FIG. 11 has a highest gray level (for example, L255) and the light controlling panel 130A of FIG. 11 is not enabled.

Figure 12B:
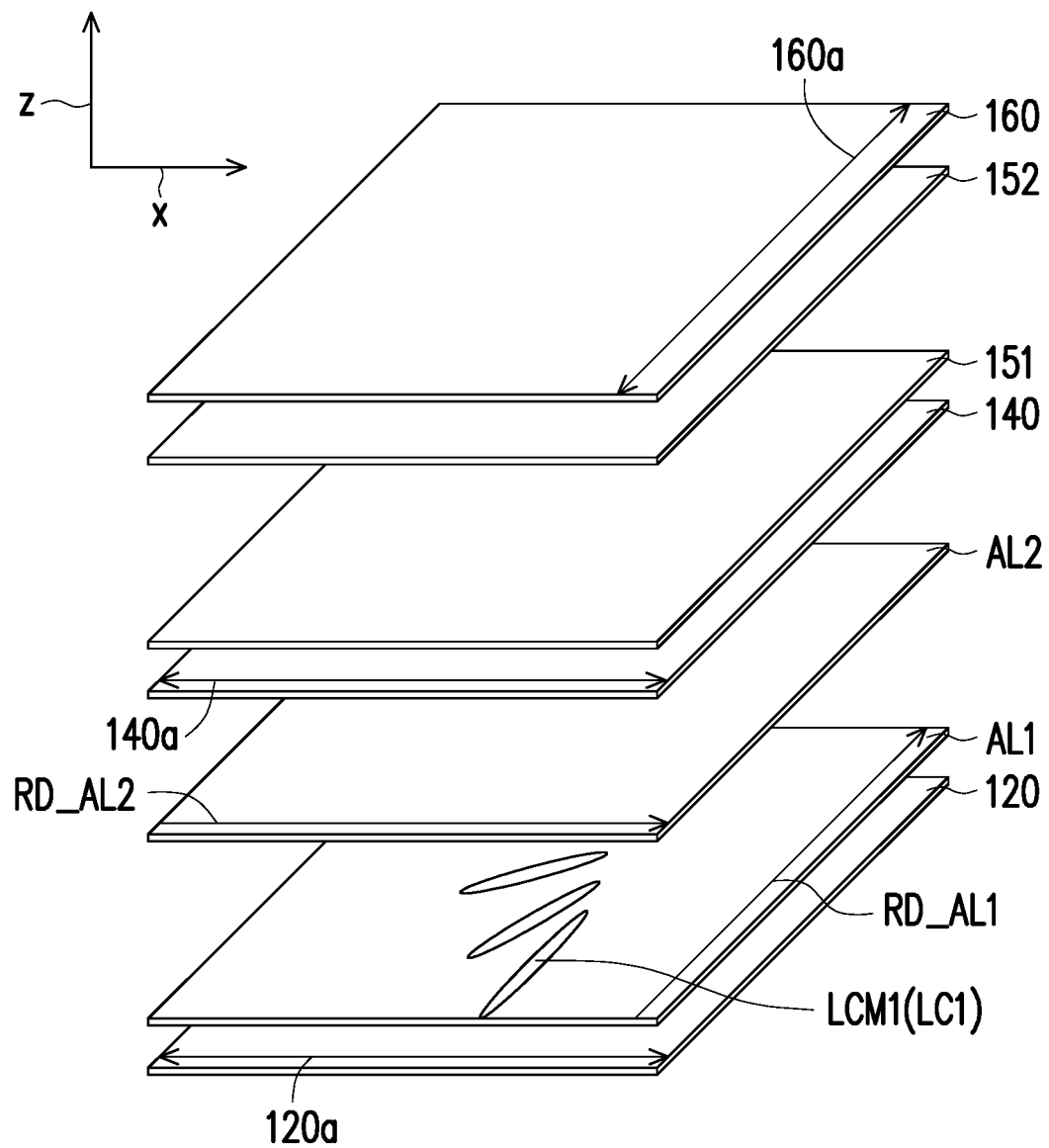
FIG. 12B shows the first polarizer 120, the first alignment film AL1 of the light controlling panel 130A, the liquid crystal layer LC1 of the light controlling panel 130A, the second alignment film AL2 of the light controlling panel 130A, the second polarizer 140, the first substrate 151 of the display panel 150, the second substrate 152 of the display panel 150, and the third polarizer 160 of FIG. 11.

FIG. 12B shows the first polarizer 120, the first alignment film AL1 of the light controlling panel 130A, the liquid crystal layer LC1 of the light controlling panel 130A, the second alignment film AL2 of the light controlling panel 130A, the second polarizer 140, the first substrate 151 of the display panel 150, the second substrate 152 of the display panel 150, and the third polarizer 160 of FIG. 11. In particular, FIG. 12B shows the state of the liquid crystal layer LC1 when the display panel 150 of FIG. 11 has a lowest gray level (for example, L0) and the light controlling panel 130A of FIG. 11 is enabled.

The display apparatus 10E of the present embodiment is similar to the display apparatus 10D, and the difference between the two is: in the embodiment of FIG. 9, FIG. 10A, and FIG. 10B, the rubbing direction RD_AL1 of the first alignment film AL1 of the light controlling panel 130A is substantially perpendicular to a plurality of scan lines (not shown) of the display panel 150; and in the embodiment of FIG. 11, FIG. 12A, and FIG. 12B, the rubbing direction RD_AL1 of the first alignment film AL1 of the light controlling panel 130A is substantially parallel to a plurality of scan lines (not shown) of the display panel 150.

The display apparatus 10E has functions and advantages similar to those of the display apparatus 10D and are not repeated herein.

Figure 13:
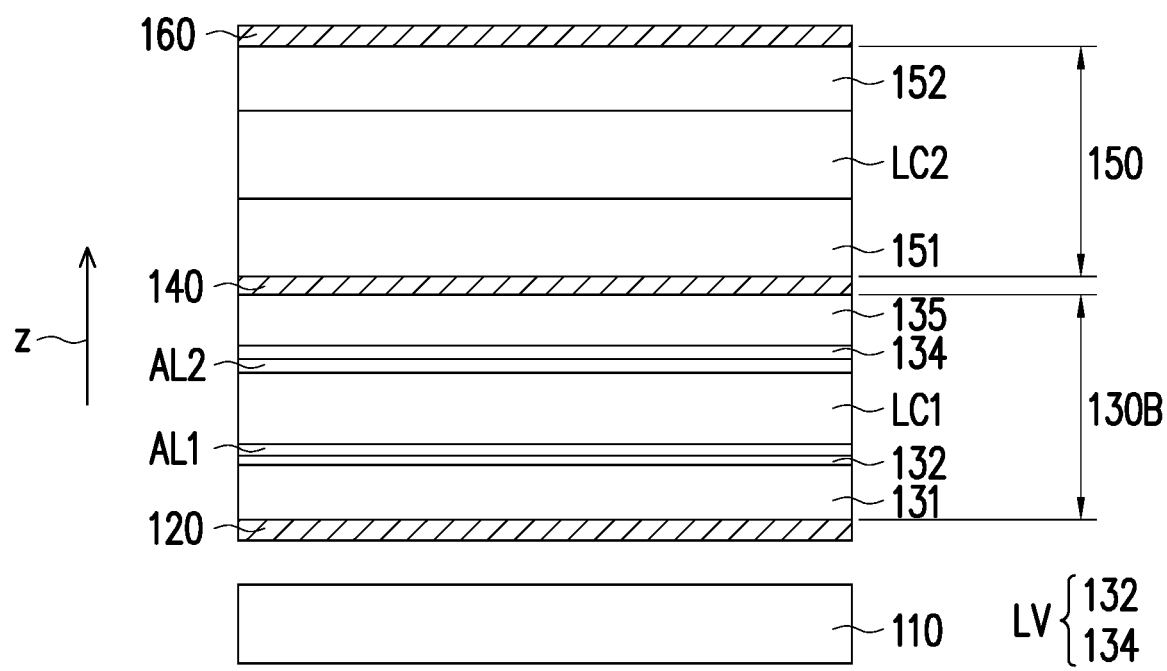
FIG. 13 is a schematic cross-sectional view of a display apparatus 10F of an embodiment of the invention.

FIG. 13 is a schematic cross-sectional view of a display apparatus 10F of an embodiment of the invention.

Figure 14A:
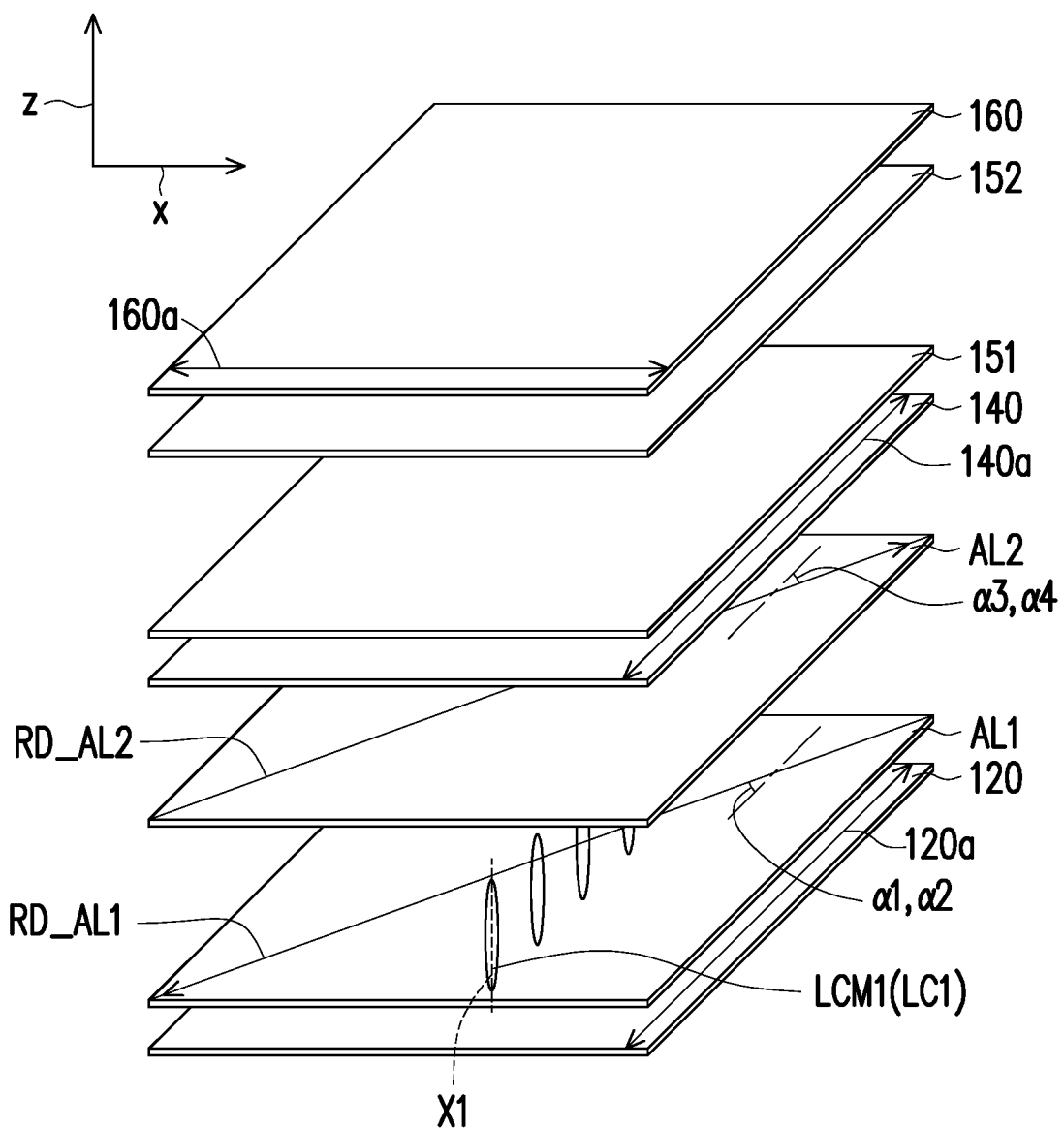
FIG. 14A shows the first polarizer 120, the first alignment film AL1 of the light controlling panel 130B, the liquid crystal layer LC1 of the light controlling panel 130B, the second alignment film AL2 of the light controlling panel 130B, the second polarizer 140, the first substrate 151 of the display panel 150, the second substrate 152 of the display panel 150, and the third polarizer 160 of FIG. 13.

FIG. 14A shows the first polarizer 120, the first alignment film AL1 of the light controlling panel 130B, the liquid crystal layer LC1 of the light controlling panel 130B, the second alignment film AL2 of the light controlling panel 130B, the second polarizer 140, the first substrate 151 of the display panel 150, the second substrate 152 of the display panel 150, and the third polarizer 160 of FIG. 13. In particular, FIG. 14A shows the state of the liquid crystal layer LC1 when the display panel 150 of FIG. 13 has a highest gray level (for example, L255) and the light controlling panel 130B of FIG. 13 is not enabled.

Figure 14B:
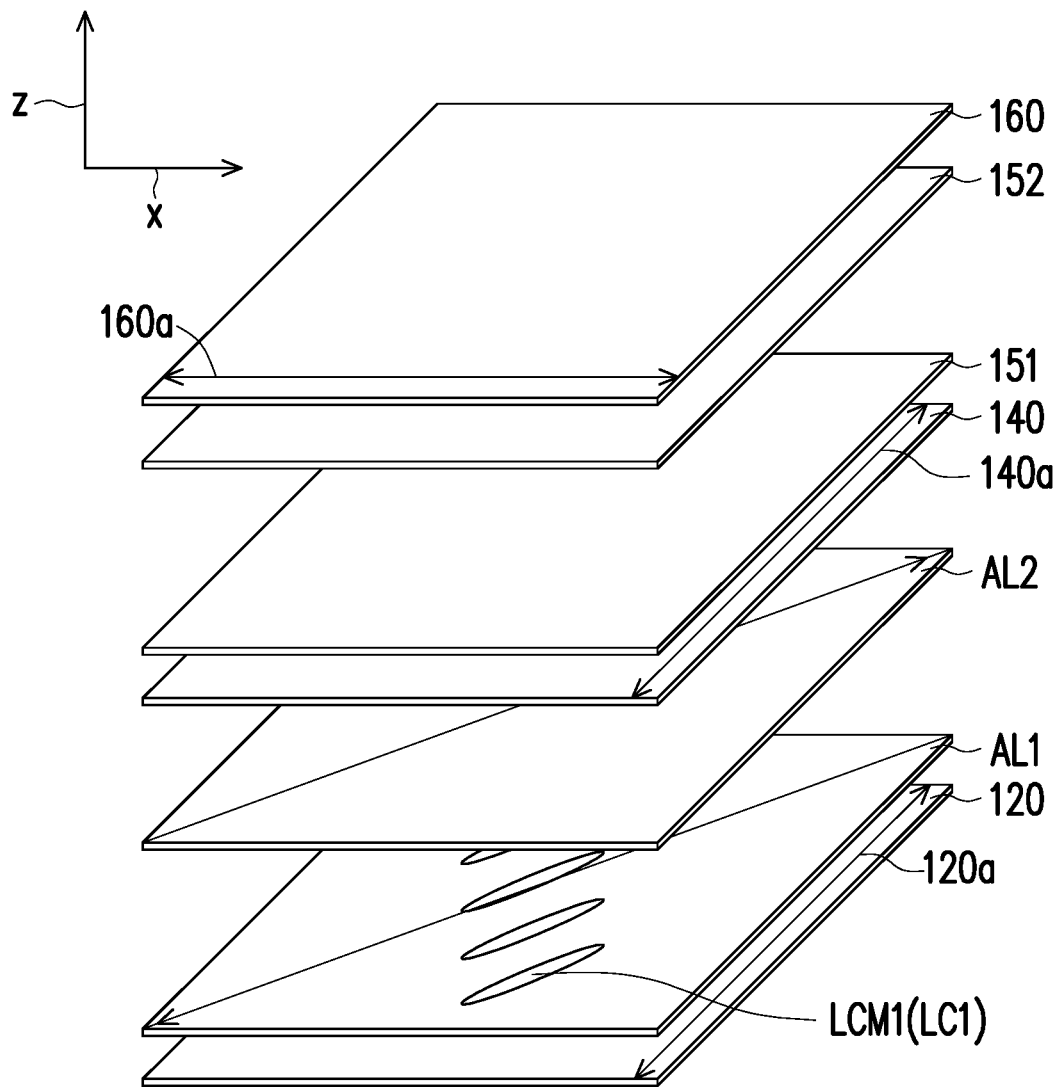
FIG. 14B shows the first polarizer 120, the first alignment film AL1 of the light controlling panel 130B, the liquid crystal layer LC1 of the light controlling panel 130B, the second alignment film AL2 of the light controlling panel 130B, the second polarizer 140, the first substrate 151 of the display panel 150, the second substrate 152 of the display panel 150, and the third polarizer 160 of FIG. 13.

FIG. 14B shows the first polarizer 120, the first alignment film AL1 of the light controlling panel 130B, the liquid crystal layer LC1 of the light controlling panel 130B, the second alignment film AL2 of the light controlling panel 130B, the second polarizer 140, the first substrate 151 of the display panel 150, the second substrate 152 of the display panel 150, and the third polarizer 160 of FIG. 13. In particular, FIG. 14B shows the state of the liquid crystal layer LC1 when the display panel 150 of FIG. 13 has a lowest gray level (for example, L0) and the light controlling panel 130B of FIG. 13 is enabled.

Referring to FIG. 13, FIG. 14A, and FIG. 14B, the display apparatus 10F of the present embodiment is similar to the display apparatus 10. The difference between the two is that the light controlling panel 130B of the display apparatus 10F is different from the light controlling panel 130 of the display apparatus 10.

In the present embodiment, the first electrode 132 and the second electrode 134 of the light valve structures LV of the light controlling panel 130B are respectively disposed on the first substrate 131 and the second substrate 135, the first alignment film AL1 covers the first electrode 132, and the second alignment film AL2 covers the second electrode 134, and the first electrode 132 and the second electrode 134 of the light valve structures LV of the light controlling panel 130B are both full-surface electrodes. Moreover, in the present embodiment, the rubbing direction RD_AL1 of the first alignment film AL1 and the rubbing direction RD_AL2 of the second alignment film AL2 are substantially opposite, and when the light controlling panel 130B is substantially not enabled, the long axis X1 of the liquid crystal molecules LCM1 of the liquid crystal layer LC1 may be substantially perpendicular to the first substrate 131 (that is, the pretilt angle of the liquid crystal molecules LCM1 is substantially 90°). In short, in the present embodiment, the light controlling panel 130B may be a special electrically controlled birefringence mode; and different from the traditional electrically controlled birefringence (ECB) mode, the liquid crystal layer LC1 of the light controlling panel 130B of the special ECB mode is vertically aligned.

Similarly, in the present embodiment, the transmittance axis 120a of the first polarizer 120 and the transmittance axis 140a of the second polarizer 140 are substantially parallel, and the transmittance axis 140a of the second polarizer 140 and the transmittance axis 160a of the third polarizer 160 are substantially perpendicular; and the assembly of the first polarizer 120, the light controlling panel 130B, and the second polarizer 140 may be regarded as a shutter. When the light controlling panel 130B is substantially not enabled (that is, when the potential difference between the first electrode 132 and the second electrode 134 of the light valve structures LV is not enough to rotate the plurality of liquid crystal molecules LCM1 of the liquid crystal layer LC1), the transmittance of the shutter has a maximum value. In other words, the shutter including the first polarizer 120, the light controlling panel 130B, and the second polarizer 140 is in a normal white mode. The liquid crystal efficiency of the shutter in the normal white mode is high, so the overall transmittance of the display apparatus 10F may be significantly improved.

In the present embodiment, there is a first acute angle α1 between the transmittance axis 120a of the first polarizer 120 and the rubbing direction RD_AL1 of the first alignment film AL1, there is a second acute angle α2 between the transmittance axis 140a of the second polarizer 140 and the rubbing direction RD_AL1 of the first alignment film AL1, and the first acute angle α1 and the second acute angle α2 are substantially the same. In the present embodiment, there is a third acute angle α3 between the transmittance axis 120a of the first polarizer 120 and the rubbing direction RD_AL2 of the second alignment film AL2, there is a fourth acute angle α4 between the transmittance axis 140a of the second polarizer 140 and the rubbing direction RD_AL2 of the second alignment film AL2, and the third acute angle α3 and the fourth acute angle α4 are substantially the same. In the present embodiment, the first acute angle α1, the second acute angle α2, the third acute angle α3, and the fourth acute angle α4 are substantially the same.

Figure 15:
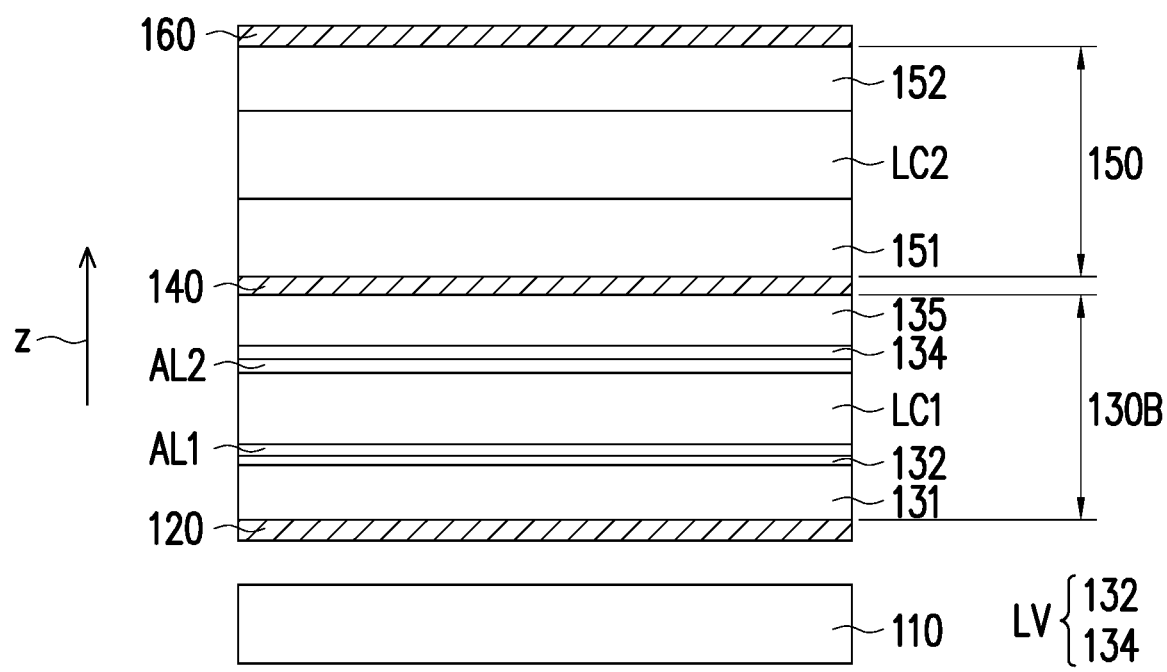
FIG. 15 is a schematic cross-sectional view of a display apparatus 10G of an embodiment of the invention.

FIG. 15 is a schematic cross-sectional view of a display apparatus 10G of an embodiment of the invention.

Figure 16A:
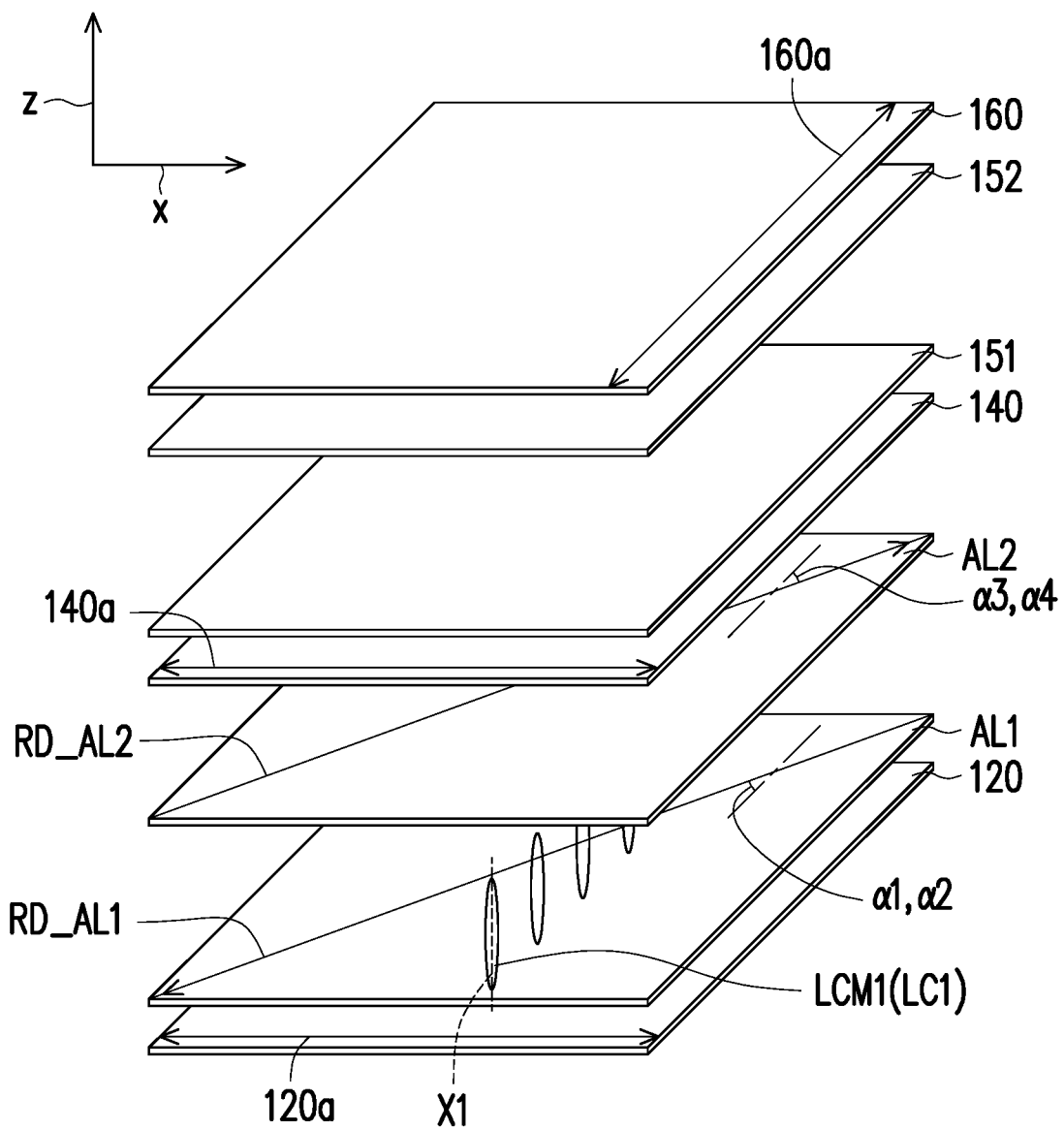
FIG. 16A shows the first polarizer 120, the first alignment film AL1 of the light controlling panel 130B, the liquid crystal layer LC1 of the light controlling panel 130B, the second alignment film AL2 of the light controlling panel 130B, the second polarizer 140, the first substrate 151 of the display panel 150, the second substrate 152 of the display panel 150, and the third polarizer 160 of FIG. 15.

FIG. 16A shows the first polarizer 120, the first alignment film AL1 of the light controlling panel 130B, the liquid crystal layer LC1 of the light controlling panel 130B, the second alignment film AL2 of the light controlling panel 130B, the second polarizer 140, the first substrate 151 of the display panel 150, the second substrate 152 of the display panel 150, and the third polarizer 160 of FIG. 15. In particular, FIG. 16A shows the state of the liquid crystal layer LC1 when the display panel 150 of FIG. 15 has a highest gray level (for example, L255) and the light controlling panel 130B of FIG. 15 is not enabled.

Figure 16B:
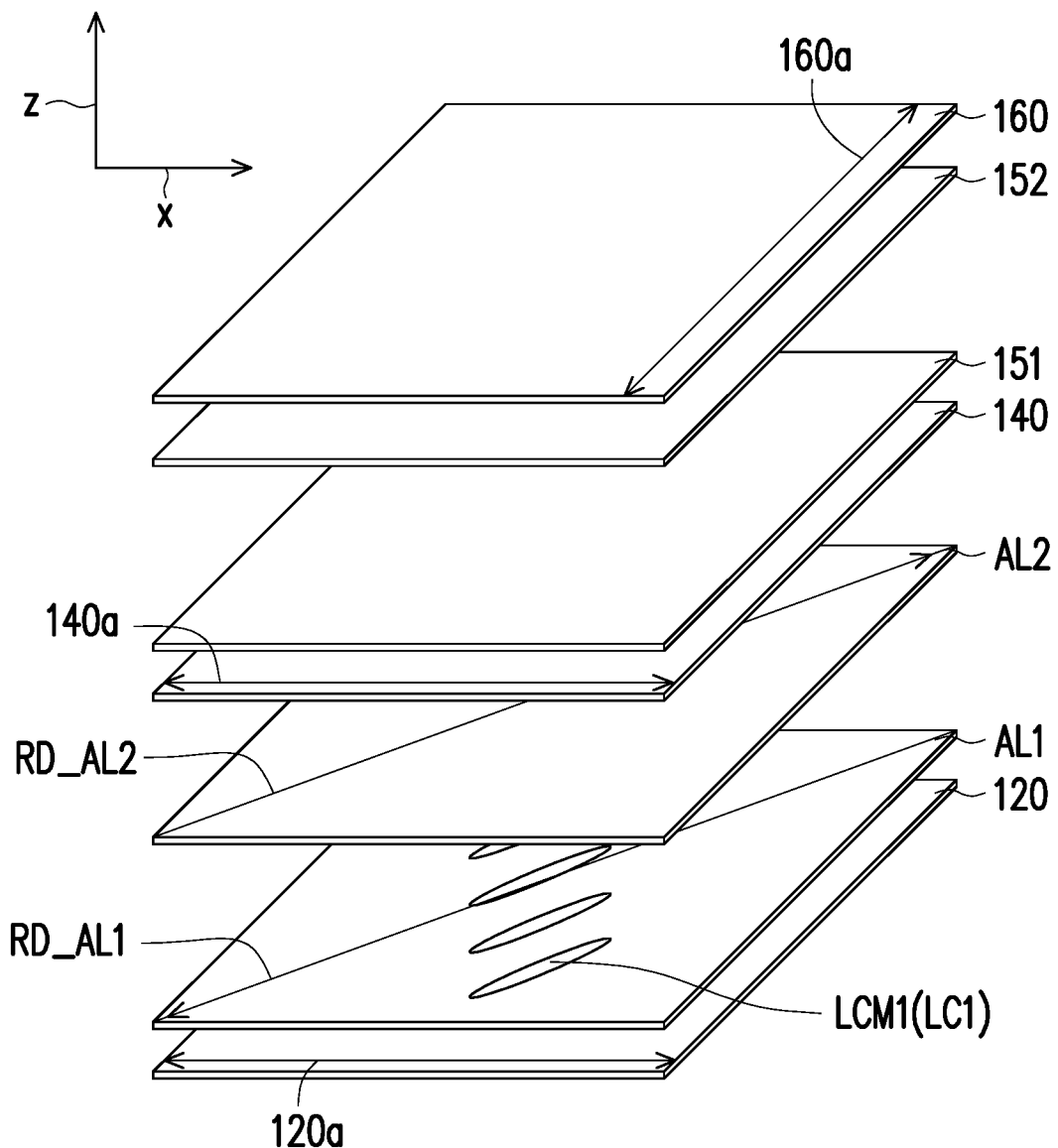
FIG. 16B shows the first polarizer 120, the first alignment film AL1 of the light controlling panel 130B, the liquid crystal layer LC1 of the light controlling panel 130B, the second alignment film AL2 of the light controlling panel 130B, the second polarizer 140, the first substrate 151 of the display panel 150, the second substrate 152 of the display panel 150, and the third polarizer 160 of FIG. 15.

FIG. 16B shows the first polarizer 120, the first alignment film AL1 of the light controlling panel 130B, the liquid crystal layer LC1 of the light controlling panel 130B, the second alignment film AL2 of the light controlling panel 130B, the second polarizer 140, the first substrate 151 of the display panel 150, the second substrate 152 of the display panel 150, and the third polarizer 160 of FIG. 15. In particular, FIG. 16B shows the state of the liquid crystal layer LC1 when the display panel 150 of FIG. 15 has a lowest gray level (for example, L0) and the light controlling panel 130B of FIG. 15 is enabled.

The display apparatus 10G of the present embodiment is similar to the display apparatus 10F, and the difference between the two is: in the embodiment of FIG. 13, FIG. 14A, and FIG. 14B, the rubbing direction RD_AL1 of the first alignment film AL1 of the light controlling panel 130B is substantially perpendicular to a plurality of scan lines (not shown) of the display panel 150; but in the embodiment of FIG. 15, FIG. 16A, and FIG. 16B, the rubbing direction RD_AL1 of the first alignment film AL1 of the light controlling panel 130B is substantially parallel to a plurality of scan lines (not shown) of the display panel 150.

The display apparatus 10F has functions and advantages similar to those of the display apparatus 10G and are not repeated herein.

What is claimed is:

1. A display apparatus, comprising:
   a backlight;
   a first polarizer;
   a light controlling panel;
   a second polarizer;
   a display panel; and
   a third polarizer, wherein the backlight, the first polarizer, the light controlling panel, the second polarizer, the display panel, and the third polarizer are sequentially arranged along a direction;
   a transmission axis of the first polarizer and a transmission axis of the second polarizer are substantially parallel, and the transmission axis of the second polarizer and a transmission axis of the third polarizer are substantially perpendicular;
   a set of the first polarizer, the light controlling panel, and the second polarizer has a transmittance, and the transmittance has a maximum value when the light controlling panel is not enabled;
   wherein the light controlling panel comprises:
      a first substrate;
      a first alignment film;
      a liquid crystal layer;
      a second substrate, wherein the first substrate, the first alignment film, the liquid crystal layer, and the second substrate are sequentially arranged along the direction, and the transmission axis of the first polarizer and the transmission axis of the second polarizer are substantially perpendicular to a rubbing direction of the first alignment film; and
      a second alignment film, wherein the first substrate, the first alignment film, the liquid crystal layer, the second alignment film, and the second substrate are sequentially arranged along the direction, and the transmission axis of the first polarizer and the transmission axis of the second polarizer are substantially parallel to a rubbing direction of the second alignment film.

2. A display apparatus, comprising:
   a backlight;
   a first polarizer;
   a light controlling panel;
   a second polarizer;
   a display panel; and
   a third polarizer, wherein the backlight, the first polarizer, the light controlling panel, the second polarizer, the display panel, and the third polarizer are sequentially arranged along a direction;
   a transmission axis of the first polarizer and a transmission axis of the second polarizer are substantially parallel, and the transmission axis of the second polarizer and a transmission axis of the third polarizer are substantially perpendicular;
   a set of the first polarizer, the light controlling panel, and the second polarizer has a transmittance, and the transmittance has a maximum value when the light controlling panel is not enabled;
   wherein the light controlling panel comprises:
      a first substrate;
      a first alignment film;
      a liquid crystal layer; and
      a second substrate, wherein the first substrate, the first alignment film, the liquid crystal layer, and the second substrate are sequentially arranged along the direction;
      the transmission axis of the first polarizer and the transmission axis of the second polarizer are substantially parallel to a rubbing direction of the first alignment film.

3. The display apparatus of claim 2, wherein the light controlling panel further comprises:
   a second alignment film, wherein the first substrate, the first alignment film, the liquid crystal layer, the second alignment film, and the second substrate are sequentially arranged along the direction;
   the transmission axis of the first polarizer and the transmission axis of the second polarizer are substantially parallel to a rubbing direction of the second alignment film.

4. The display apparatus of claim 2, wherein the light controlling panel further comprises:
   a second alignment film, wherein the first substrate, the first alignment film, the liquid crystal layer, the second alignment film, and the second substrate are sequentially arranged along the direction;
   the transmission axis of the first polarizer and the transmission axis of the second polarizer are substantially perpendicular to a rubbing direction of the second alignment film.

5. A display apparatus, comprising:
   a backlight;
   a first polarizer;
   a light controlling panel;
   a second polarizer;
   a display panel; and
   a third polarizer, wherein the backlight, the first polarizer, the light controlling panel, the second polarizer, the display panel, and the third polarizer are sequentially arranged along a direction;
   a transmission axis of the first polarizer and a transmission axis of the second polarizer are substantially parallel, and the transmission axis of the second polarizer and a transmission axis of the third polarizer are substantially perpendicular;

a set of the first polarizer, the light controlling panel, and the second polarizer has a transmittance, and the transmittance has a maximum value when the light controlling panel is not enabled;

wherein the light controlling panel comprises:
- a first substrate;
- a first alignment film;
- a liquid crystal layer; and
- a second substrate, wherein the first substrate, the first alignment film, the liquid crystal layer, and the second substrate are sequentially arranged along the direction;
- a first acute angle is between the transmission axis of the first polarizer and a rubbing direction of the first alignment film, a second acute angle is between the transmission axis of the second polarizer and the rubbing direction of the first alignment film, and the first acute angle and the second acute angle are substantially the same.

6. The display apparatus of claim 5, wherein the light controlling panel further comprises:
- a second alignment film, wherein the first substrate, the first alignment film, the liquid crystal layer, the second alignment film, and the second substrate are sequentially arranged along the direction;
- a third acute angle is between the transmission axis of the first polarizer and a rubbing direction of the second alignment film, a fourth acute angle is between the transmission axis of the second polarizer and the rubbing direction of the second alignment film, and the third acute angle and the fourth acute angle are substantially the same.

7. The display apparatus of claim 6, wherein the first acute angle, the second acute angle, the third acute angle, and the fourth acute angle are substantially the same.

* * * * *